(12) United States Patent
Guimaraes et al.

(10) Patent No.: US 11,797,598 B2
(45) Date of Patent: Oct. 24, 2023

(54) SYSTEM AND METHOD TO AUTOMATICALLY CREATE, ASSEMBLE AND OPTIMIZE CONTENT INTO PERSONALIZED EXPERIENCES

(71) Applicant: Sitecore Corporation A/S, Copenhagen (DK)

(72) Inventors: Marc Perreau Guimaraes, Los Gatos, CA (US); Tetiana Kostenko, Frederiksberg C (DK); Samira Sadeghi, San Francisco, CA (US); Abhishek Soni, Hayward, CA (US); Romeo B. Valencia, San Francisco, CA (US); Nancy Huei-Jiun Lee, San Jose, CA (US)

(73) Assignee: SITECORE CORPORATION A/S, Copenhagen (DK)

( * ) Notice: Subject to any disclaimer, the term of this patent is extended or adjusted under 35 U.S.C. 154(b) by 84 days.

(21) Appl. No.: 17/242,007

(22) Filed: Apr. 27, 2021

(65) Prior Publication Data
US 2022/0138245 A1 May 5, 2022

Related U.S. Application Data

(60) Provisional application No. 63/108,146, filed on Oct. 30, 2020.

(51) Int. Cl.
*G06F 16/00* (2019.01)
*G06F 16/45* (2019.01)
*G06N 20/00* (2019.01)

(52) U.S. Cl.
CPC .............. *G06F 16/45* (2019.01); *G06N 20/00* (2019.01)

(58) Field of Classification Search
CPC .......... G06F 16/45; G06N 20/00; G06N 7/01
See application file for complete search history.

(56) References Cited

U.S. PATENT DOCUMENTS

| 8,429,103 B1 | 4/2013 | Aradhye et al. |
| 2002/0040374 A1 | 4/2002 | Kent |

(Continued)

FOREIGN PATENT DOCUMENTS

| WO | 2022/093673 | 5/2022 |

OTHER PUBLICATIONS

Lee, D.D., et al., "Algorithms for Non-negative Matrix Factorization", Advances in neural information processing systems, 2001, pp. 1-7.

(Continued)

*Primary Examiner* — Jared M Bibbee
(74) *Attorney, Agent, or Firm* — Gates & Cooper LLP

(57) ABSTRACT

A method and system provide the ability to personalize a digital channel. Multiple content assets are obtained and include an image content asset. Each of the assets is associated with an associated set of semantic elements. The multiple content assets are clustered into content clusters based on a similarity of the semantic elements. A first content asset is selected. The clustering is used as a metric to estimate distances between the first content asset and remaining multiple content assets. The remaining multiple content assets are scored based on the distances. One of the remaining multiple content assets is selected based on the scoring and provided for a personalized component of the digital channel. In addition, a coverage map that includes both users and content may be generated based on the clusters and then utilized to select the content asset.

24 Claims, 15 Drawing Sheets

(56) References Cited

U.S. PATENT DOCUMENTS

| | | | |
|---|---|---|---|
| 2008/0243637 A1* | 10/2008 | Chan | G06Q 30/02 705/26.1 |
| 2008/0319973 A1* | 12/2008 | Thambiratnam | G06F 16/313 707/999.005 |
| 2012/0139904 A1 | 6/2012 | Lee et al. | |
| 2012/0139984 A1* | 6/2012 | Lang | B41J 3/543 347/15 |
| 2014/0040262 A1* | 2/2014 | Winter | G06F 16/355 707/E17.046 |
| 2014/0244631 A1* | 8/2014 | Arthur | G06F 16/43 707/723 |
| 2016/0004936 A1* | 1/2016 | Sawney | G06F 18/23 382/159 |
| 2019/0114687 A1* | 4/2019 | Krishnamurthy | G06Q 30/0282 |
| 2019/0370282 A1* | 12/2019 | Vergnaud | H04N 21/4788 |
| 2020/0272672 A1 | 8/2020 | Orlov et al. | |
| 2021/0141847 A1* | 5/2021 | Govind | G06F 16/9532 |

OTHER PUBLICATIONS

Blei, D.M., et al., "Latent Dirichlet Allocation", Journal of Machine Learning Research 3, 2003, pp. 993-1022.

Zou, H., et al., "Regularization and variable selection via the elastic net", J. R. Statist. Soc. B, 2005, vol. 67, Part 2, pp. 301-320.

Friedman, J.H., "Greedy Function Approximation: a Gradient Boosting Machine", The Annals of Statistics, 2001, pp. 1189-1232, vol. 29, No. 5.

Lecun, Y., et al., "Deep learning", Nature, May 2015, pp. 436-444, vol. 521.

Vanchinathan, H.P., et al., "Explore-Exploit in Top-N Recommender Systems via Gaussian Processes", Conference: ACM Recommender Systems, Oct. 2014, pp. 1-8.

Pang, B., et al., "Opinion Mining and Sentiment Analysis", Foundations and Trends in Information Retrieval, 2008, pp. 1-135, vol. 2, Nos. 1-2.

PCT International Search Report & Written Opinion dated Jan. 31, 2022 for PCT Application No. PCT/US2021/056416.

Misiak, I., "Al, Machine Learning, Personalization, and Automation: What's the Difference?", Element Three, Nov. 14, 2019, pp. 1-9, https://elementthree.com/blog/ai-machlne-learning-personalization-and-automation-whats-the-difference/, retrieved on Dec. 21, 2021.

Australian Examination Report dated Jun. 13, 2023 for Australian Patent Application No. 2021370623.

* cited by examiner

SYSTEM AND METHOD TO AUTOMATICALLY CREATE, ASSEMBLE AND OPTIMIZE CONTENT INTO PERSONALIZED EXPERIENCES

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 63/108,146, filed on Oct. 30, 2020, with inventor(s) Marc Perreau Guimaraes, entitled "System and Method to Automatically Create, Assemble and Optimize Content into Personalized Experiences,".

This application is related to the following co-pending and commonly-assigned patent application, which application is incorporated by reference herein:

U.S. patent application Ser. No. 17/085,680, filed on Oct. 30, 2020, with inventor(s) Marc Perreau Guimaraes, Tetiana Kostenko, Samira Sadeghi, Mingde Xu, Abhishek Soni, Romeo B. Valencia, and Nancy Huei-Jiun Lee, entitled "Digital Channel Personalization Based on Artificial Intelligence (AI) and Machine Learning (ML),".

BACKGROUND OF THE INVENTION

1. Field of the Invention

The present invention relates generally to digital channel personalization, and in particular, to a method, apparatus, system, and article of manufacture for automatically creating, assembling, and optimizing content into personalized experiences using artificial intelligence (AI) and/or machine learning (ML).

2. Technical/Business Problem (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

Companies use digital channels to promote their brand, sell their products, retain or add new customers. Examples of such digital channels are websites, phone or tablet apps, email, and social media. Creating and managing the necessary content and assembling it in a personalized experience tailored to each customer is mostly a manual process requiring large digital marketing teams leading to high costs, slow innovation and little personalization.

Accordingly, what is needed is a system that autonomously/automatically personalizes a digital channel without a primarily manual process and in a manner that optimizes the personalization using machine learning/artificial intelligence.

SUMMARY OF THE INVENTION

Embodiments of the invention propose a novel system based on artificial intelligence (AI)/machine learning (ML) to automate the delivery of personalized digital content including using content semantic similarity and content suggestions. For content similarity, images and other content are processed into a set of semantic features and assets that share common semantic features with a selected asset are identified. More specifically, assets with similar content are clustered together with the clusters being used as a metric to estimate the distance between two assets. The distances are then used to score/rank assets from most to least similar for selection/personalization.

With respect to content suggestions, embodiments of the invention identify and select content that is more likely to be converted by a visitor/user. In particular, the content clusters are combined with visitor information into a coverage map where distance may again be utilized to determine the content to select for a given user/visitor. Further, such a coverage map enables the ability to address and deliver content that was not previously seen/delivered to a user (and thus not previously scored based on prior user interactions). AI and machine learning may be utilized to both generate the clusters as well as to generate the model used to select content. Such clustering/modeling may be performed iteratively based on newly added content and visitor data resulting in a continuously optimized digital channel that is optimized on a per user/visitor basis.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Structural Overview

Figure 1:
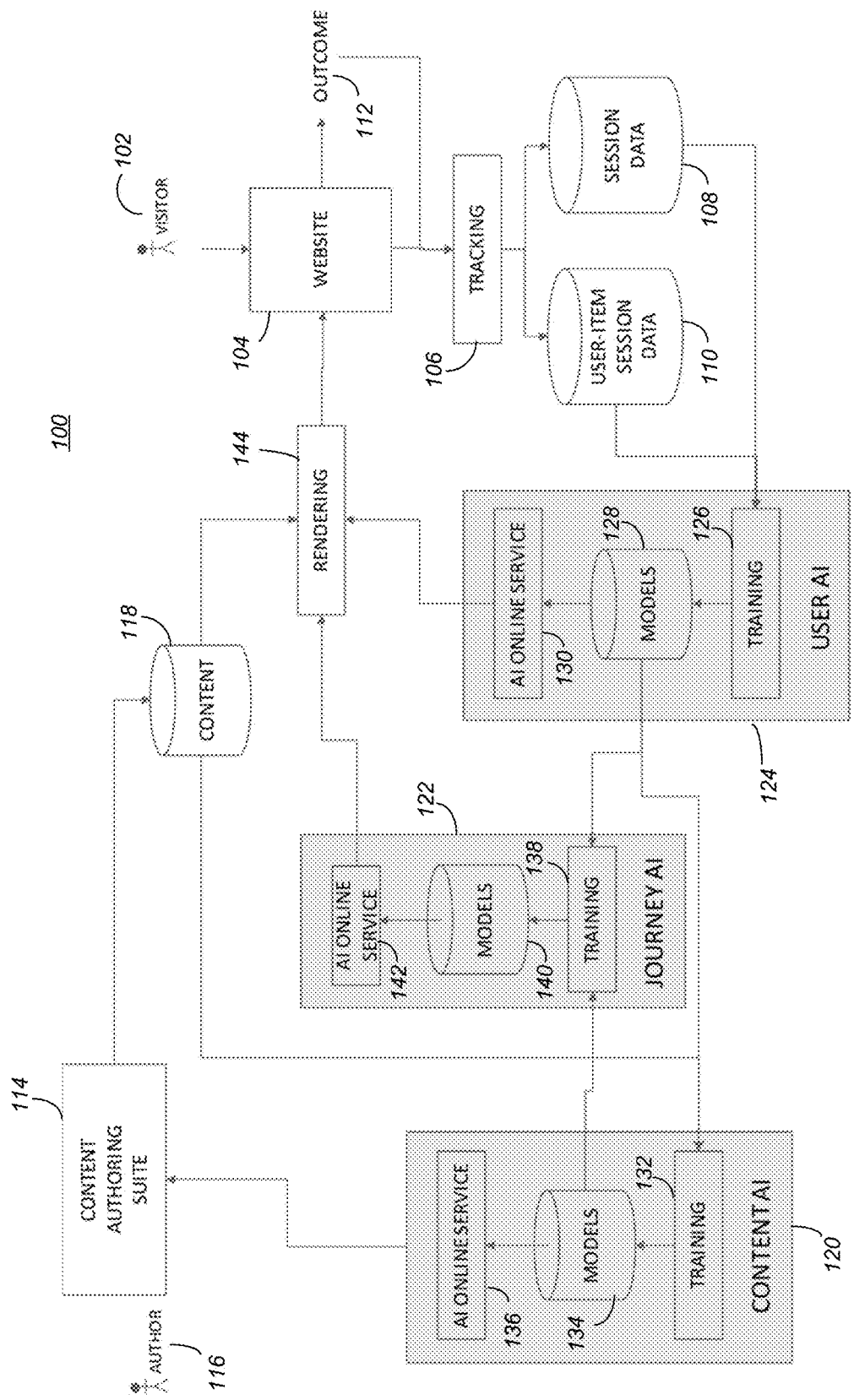
FIG. 1 illustrates the structural overview of a digital channel personalization system in accordance with one or more embodiments of the invention.

FIG. 1 illustrates the structural overview of a digital channel personalization system 100 in accordance with one or more embodiments of the invention. When a visitor 102 visits a customer website 104, embodiments of the invention collect data all along the session (i.e., via tracking 106). There are three kinds of data collected. Session data 108 is made of contextual data such as time, region, browser and device. User-item (session) data 110 corresponds to events associating the visitor to the content: visitor x was shown content y in placeholder z. Outcome data 112 records events related to the business value of the session such as goals, monetary value. At the other side of the application, an authoring suite 114 provides tools for digital marketing teams/authors 116 to create new content 118.

There are three (3) principal modules 120-124 that may be used to develop/determine content 118.

The user AI 124 gets batches of user-item data 110 and session data 108 to train 126 models 128 that by segmenting users aim at recommending content 118 for placeholders in the digital channel/website such as maximizing the expected business value of the session (outcome). Trained models 128 are then used to recommend content 118 in real time through the user AI online service 130.

The content AI 120 breaks down content 118 (text, images, videos) into attributes (keywords, topics, sentiment, color, landscape, faces) and trains 132 models 134 to estimate the performance of content and content attributes in the user segments. The trained models 134 are then used to recommend content 118 through the user AI online service 136.

The journey AI 122 uses information provided by the user AI 124 and the content AI 120 to recommend the sequence of events (pages, triggered events such as chat box) maximizing the expected outcome. In this regard, the journey AI 122 may also train 138 models 140 which are then used to recommend content 118 in real time through the user AI online service 142.

The training modules 126, 132 and 138 may be the same training modules or may be different for each module 120-124. Similarly, the models 128, 134, and 140, and the AI online services 130, 136, and 142 may also be the same or may be different for each module 120-124. The results from the AI online service(s) 130, 136, and 142 may be provided to a rendering module 144 to render/generate the website/digital channel 104.

In view of the above, the system 100 collects detailed information about end users 102 visiting a website 104 or similar digital experience media. This data is used to train machine learning (AI) models 128, 134, and 140 in order to predict what variation of content has the most likelihood to get an end user 102 to convert to the business objective of the website 104. A website 104, or digital experience, is composed of pages that are themselves composed of components (or blades). In most use cases, a personalized experience where components can render a variety of content optimized for each individual end user 102 leads to better outcomes than a static experience. Traditionally this is done by manually defining segments of a population based on a few contextual parameters such as region, age group, device, etc., and setting up logical rules to determine what content 118 to render 144 for a specific end user 102.

Recently, systems based on contextual machine learning such as reinforced contextual bandits have been proposed to automate the personalization of digital experiences. This relies on a few contextual parameters and does not leverage detailed behavioral data that are collected. Embodiments of the invention leverage clustering methods/algorithms to determine groups of end users 102 based on trends of behavior as well as contextual information. Each end user 102 is then defined by a unique numerical representation that maps it to its past behavior and the best estimation of its future behavior. The system 100 regresses the outcome of interest, a business measure of success, to the numerical representation of end users. The parameters of those models 128, 134, and 140 are trained on a regular basis using available data collected on past visits to the website. The system 100 may also provide recommendations for new end users 102 for whom there is no or little past data and new content for which there is no past rendering.

In view of the above, embodiments of the invention leverage three principal subsystems:

The User AI 124 leverages past visit data to model visitor behavior and predict outcomes for each visitor 102 and each potential experience;

The Content AI 120 models content attributes and predicts content similarities and content performance for each type of behavior found by the user AI 124.

The Journey AI 122 leverages outputs from both the user AI 124 (also referred to as behavior AI) and the content AI 120 is to assemble experiences tailored for each visitor 102.

Accordingly, the system 100 may provide one or more of the following features:

Collects detailed behavioral information at each visit of the digital experience (e.g., via tracking 106).

Automatically segments end users in groups of similar behavior.

Automatically determines the content 118 to render for each end user/visitor 102 in order to maximize the business outcome.

Automatically personalizes experiences from an existing set of content and pre-defined layouts.

Automatically creates personalized sequences of frames forming experiences. This enables businesses to automate the digital channel from end to end.

Optimizes personalization for new end users.

Optimizes personalization for new content.

Provides analytic insights into visitor segments (or principal behaviors) allowing businesses to better understand their market.

Provides analytical insights into how content attributes perform with visitor segments (thereby allowing business to create content covering all of their market/potential market).

Provides content and frame templates for a specific industry. This enables businesses to quickly start a new digital channel.

Term Definitions

Experience=a visit
Frame=a page
Layout=defines how and where the content is rendered in a frame (page)
Content=text, image, video
Outcome=some measure of business gain AI Component Overview User AI 124

The User AI 124 uses past visits stored in a database to model visitor behavior though three main variables: Content (C), Visitor (V) and Outcomes (O).

Content (C) (or a piece of content) that may consist of text, image, video, layout (or a superset of those), may be represented by a unique identifier.

A Visitor (V) 102 is represented by all the data collected about a visitor's past visits including what content was presented, how it was assembled, the visitor actions, outcomes of the visits and profile information such as regions, devices, browsers.

Outcomes 112 are actions by the visitor 102 that trigger a gain to the business, such as buying a product. The user AI 124 models the interactions between the visitor 102 and the digital channel and uses an algorithm to assign a probability (or score) P(C, V, O) to each different possible case. The aim of the user AI 124 is to maximize the expected outcome for a given visitor.

Content AI 120

The content AI 120 is a set of methods to decompose content into attributes. Text may be decomposed into three different types of attributes:

(1) Frequency modeling and generative models may be used to describe each text as a set of numerical weights to topics. Using topic modeling methods such as in [2], content may be assigned to topics and the vector of assignments may be used as input for a regression step.

(2) Sentiment analysis may be used to describe each text as weights to a set of sentiments. Many implementations exist as described in [7].

(3) Topic decompositions may be used and can be based on the methods for user AI as described in co-pending U.S. application Ser. No. 17/085,680 which is incorporated by reference herein (e.g., Latent Dirichlet Allocation (LDA)).

Each text is then represented by a numerical vector obtained by assembling all the weights.

Images may be decomposed using standard image processing techniques and deep learning methods. Examples of image attributes are:

High level categories such as landscape, indoors, photograph, sketch, abstract;

Objects categories such as human face, recognized objects (tree, car, . . . ), shapes;

Size, background color, textures; and

Metadata such as author, tags, dates.

As with text, topic modeling may be used to create numerical vectors representing the image (signature).

A regression step may then be used to map content attributes to principal behaviors using similar regression techniques as that used for the user AI 124 and described in the co-pending U.S. application Ser. No. 17/085,680. The main output of the content AI 120 is the capability to predict the performance of a content attribute in different clusters (segments) of visitors.

Journey AI 122

The journey AI 122 maximizes the expectation of the outcome 112 as a function of a superset of content. This superset of content is represented by the sequence of frames (or pages) in the experiences. The system estimates the transition matrix from past data penalized by a set of human entered prohibitions and rules with a reward punishment method at the regression stage. The transition matrix is the input of the regression stage with associated outcomes.

The data is represented as frequencies of each transition frame x to frame y in each of the user segments. These frequencies are maximum likelihood estimators of the likelihood of going from a frame x to a frame y in a user segment. These frequency estimations can be smoothed for transition without enough examples in the past data by the same Bayesian methods as described in the co-pending U.S. patent application Ser. No. 17/085,680.

A regression model finds the transitions maximizing the outcome expectation as a function of the segment, user-session properties such as region, devices or browser and prohibition status (or level) of the transition:

For each possible transition from frame x we use the model:

$$Outcome \sim frame_x + transition + segment + region + device + browser + prohibition\_level$$

Any other user-session information can be added to the model. Standard regression models may be used to implement the regression step.

As for the user AI 124 and content AI 120, the results of the regression may be smoothed using Bayesian methods and the actual rendered frame is given by drawing randomly on the distribution derived from the above steps.

Content AI 120 Details

Content AI 120 is a set of products aimed at facilitating and accelerating the selection of content for a personalized component in a digital experience (such as a website). Content AI 120 currently has two features, Content AI semantic similarity and Content AI suggestions.

Content AI Feature Overview

Content AI Semantic Similarity

For many enterprise digital experiences, the content library is very large, often containing more than one (1) million assets. Being able to quickly find similar assets based on semantic features enables companies to reuse content and save on expensive agency fees.

Embodiments of the invention find, in an existing library, assets that share some semantic common features with a selected asset. The asset here is an image. Content AI similarity uses vision algorithms to describe/process images into a set of elements (e.g., textual description/classification) such as a person walking on a street with buildings and a tree. The vision algorithms also give descriptions about colors. Embodiments of the invention are not limited to any specific vision algorithm. Instead, embodiments of the invention utilize an image as input to a vision algorithm and the output consists of a textual description/classification/color and may additionally include a confidence value representative of the accuracy/level of accuracy/level of confidence of the textual description/classification. One or more embodiments of the invention may utilize the MICROSOFT AZURE computer vision algorithm.

Embodiments of the invention may further use the output of the vision algorithm to cluster assets with similar content and use the clustering as a metric to estimate the distance between two assets. The distances are then used to rank assets from the most similar to the most dissimilar from a selected asset (chosen by the user).

Figure 2A:
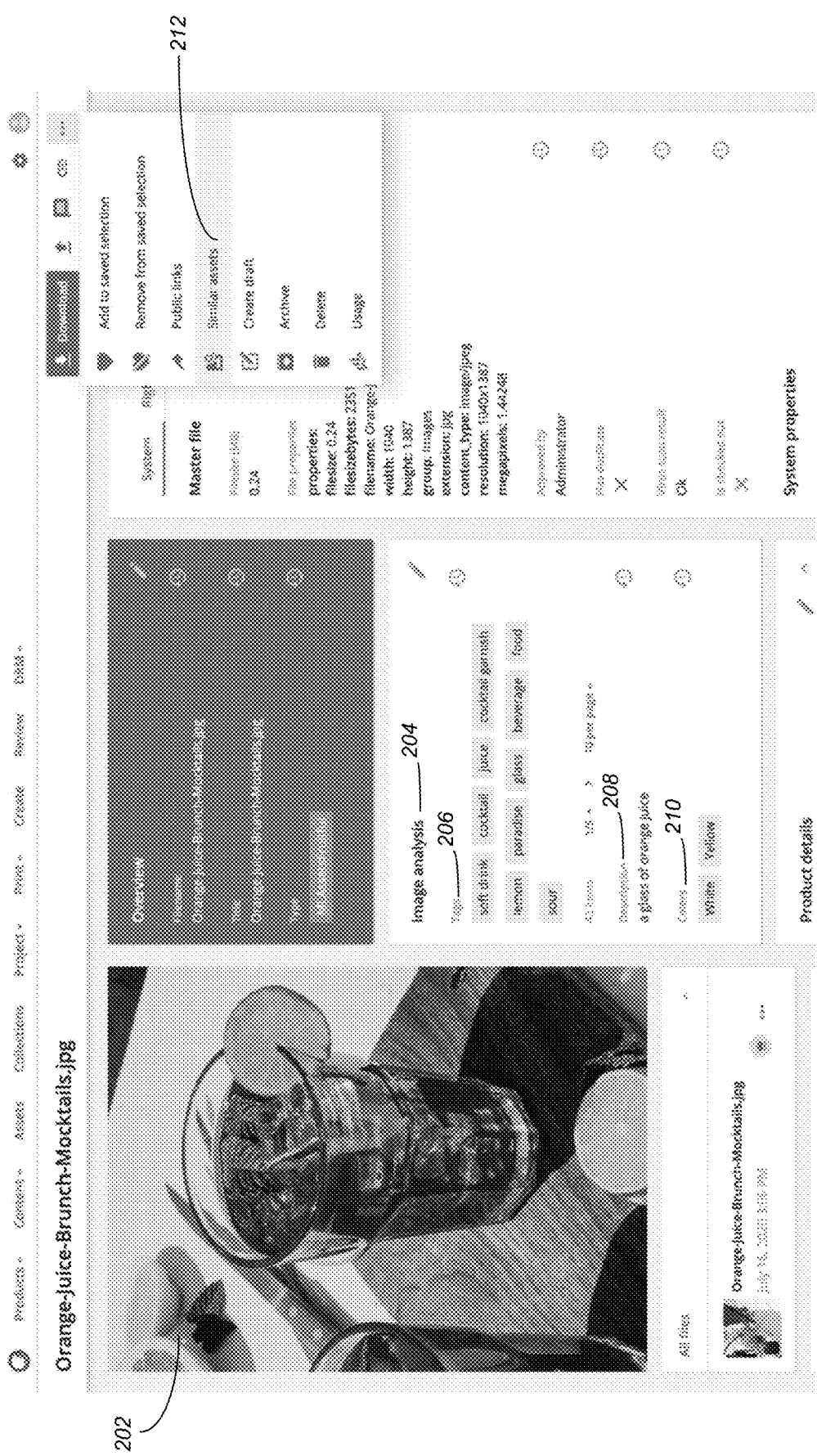
FIGS. 2A and 2B illustrate exemplary graphical user interfaces for a content AI semantic similarity workflow in accordance with one or more embodiments of the invention.
Figure 2B:
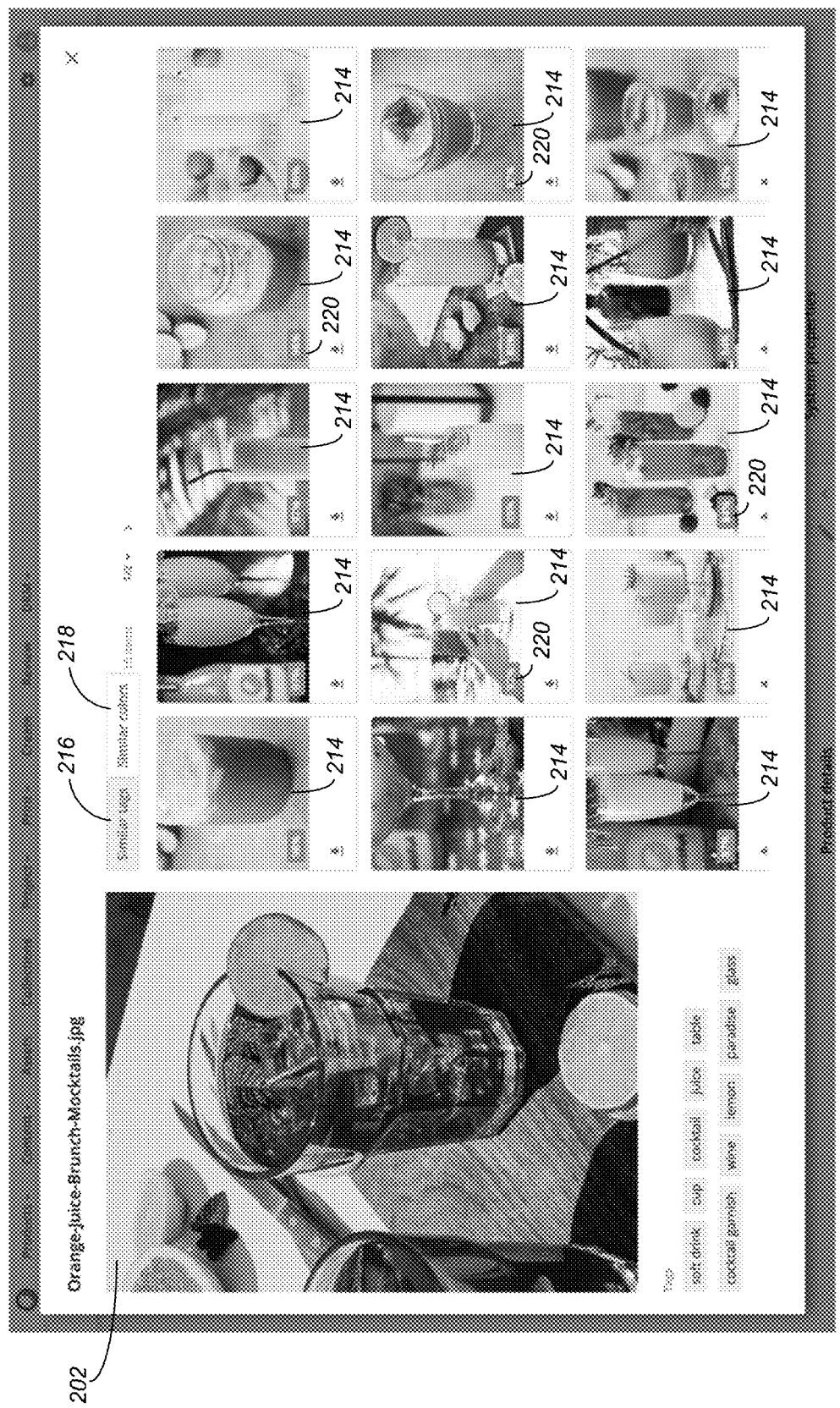

FIGS. 2A and 2B illustrate exemplary graphical user interfaces for a content AI semantic similarity workflow in accordance with one or more embodiments of the invention. In FIG. 2A, the user starts from an existing asset 202, here an image "Orange-Juice-Brunch-Mocktails.jpg". The vision algorithm processes the image to describe the image in a set of elements—e.g., the resulting image analysis 204 resulting in image tags 206 (soft drink, cocktail, juice, cocktail garnish, lemon, paradise, glass, beverage, food, sour), a description 208 (a glass of orange juice), and colors 210 (white, yellow). Upon selecting the similar asset's menu item 212, the graphical user interface of FIG. 2B may be displayed showing similar assets sharing some of the same features, such as a glass, juice, lemon, etc. As illustrated, the assets 214 with similar tags 216 are illustrated and the user may opt to alternatively view assets with similar colors 218. Embodiments may also display percentages 220 for the similar assets 214 reflecting a level of confidence percentage similarity, ranked similarity, etc. with respect to the existing asset 202.

Content AI Suggestions

Personalizing a digital experience requires both: (1) many versions of content for components of the site, and (2) methods to find the best variation to display to each visitor. Auto-personalization (e.g., user AI 124) provides an automated solution to the problem of finding the right variation for each visitor but creating the content and selecting the set of assets for each personalized component is still a very manual and time-consuming process. Content AI 120 suggestions accelerate this selection of content by suggesting to the digital marketers existing content that are more likely to convert the visitor 102.

Content AI suggestions leverage both the visitor clusters generated by the auto-segmentation of auto-personalization/user AI 124 and Content AI similarity to be able to address content that was not previously seen by a visitor 102 and thus not scored in the auto-personalization 124 clusters.

Clustering Overview

Figure 3:
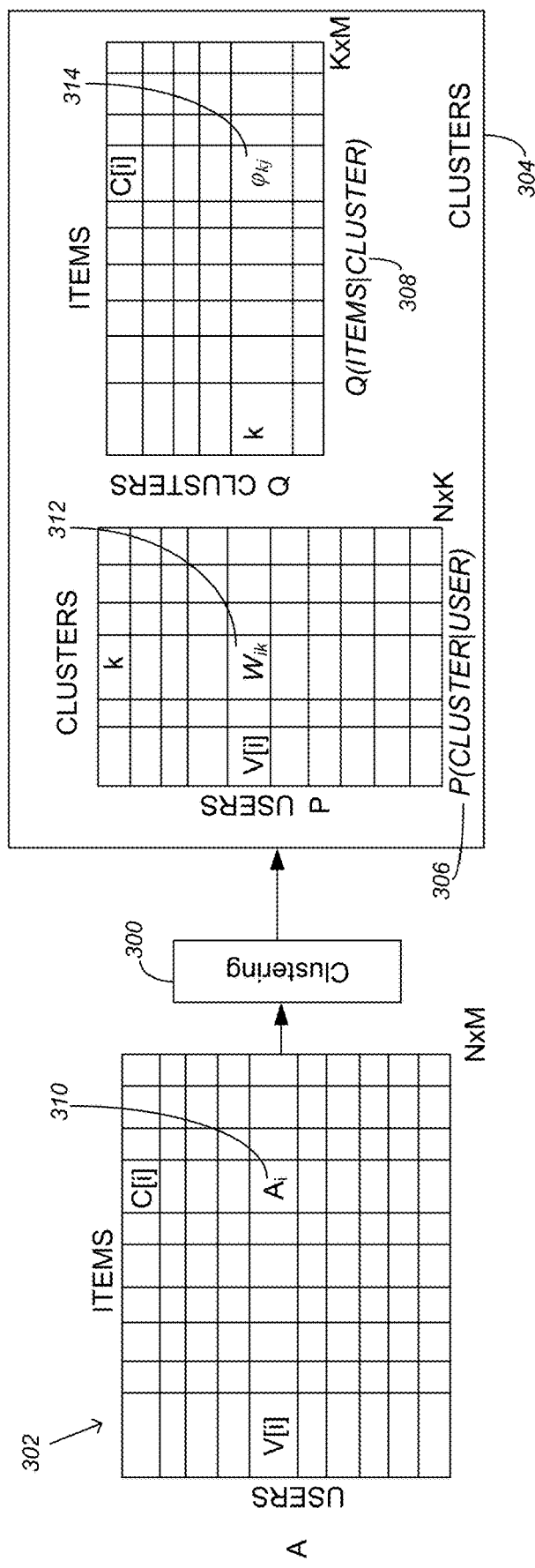
FIG. 3 illustrates the use of clustering in accordance with one or more embodiments of the invention.

As set forth in further detail in the co-pending U.S. patent application Ser. No. 17/085,680, one of the steps towards recommending content to the user is a clustering module. FIG. 3 illustrates the use of clustering in accordance with one or more embodiments of the invention. Clustering 300 uses user-item data 302 to segment/cluster the user population into principal behavioral groups 304 (also called topics).

This clustering 300 provides for each user, a matrix 306 indicating how representative each topic is P(CLUSTER|USER) and a matrix 308 (Q(ITEMS|CLUSTER)) giving for each cluster, the performance (P) of each item P(ITEM|CLUSTER), which in this case is used to estimate the outcome for each item in a cluster P(OUTCOME|CLUSTER,ITEM).

More specifically, we start with user-item matrix $A(V, C)_{N \times M}$ 302 which sets for each past visitor (V) and each content (C), a value monotonic to the aggregated outcomes of all visits of this visitor V where the content C was shown. The matrix A 310 is then decomposed/clustered 300 into two matrices $P_{N \times K}$ 306 and $Q_{K \times M}$ 308 that may include minimizing the error $\|A - \hat{A}\|$ where $\hat{A} = PQ$.

The matrix P 306 holds a decomposition of each visitor into a set of K principal behaviors (latent factor vector) described by the matrix Q 308.

Where:

$w_{ik}$ 312 measures how representative cluster k is for visitor i←P(CLUSTER|USER).

$\varphi_{kj}$ 314 is a measure of success of content j on cluster k,←P(ITEM|CLUSTER).

$\varphi_{kj}$ 314 is used to estimate the outcome for each item in a cluster←P(OUTCOME|CLUSTER,ITEM).

$$\varphi_{kj} = \frac{\Sigma_i w_{ik} \phi_{ij}}{\Sigma_i w_{ik}} \quad (1)$$

ϕ is measure of business gain based on customer. A score for each visitor and each item will be calculated as:

$$\hat{A}_{ij} = \frac{\Sigma_k w_{ik} \varphi_{kj}}{\Sigma_k w_{ik}} \quad (2)$$

Embodiments of the invention may also utilize Latent Dirichlet Allocation (LDA) as the clustering algorithm 300. LDA is one of the most popular methods for topic modelling. It is a generative probabilistic model that allows sets of observed data to be explained by latent factors. It provides an explanation on why some parts of the data are similar. LDA uses Dirichlet distributions as priors to model document-topic and word-topic. Embodiments of the invention may define P(C, V, O) as a mixture of multinomial models with priors for the mixture distribution as well as for the individual multinomial distributions.

In the context of LDA, each user with all of its' historical interactions forms a document. LDA will be applied on all users and the outcome will be a weight vector for each visitor which shows how representative cluster k is for user i, namely it provides $w_{ik}$ 312.

Content Suggestion

One of the first steps in Content AI 120 is content suggestion. The goal is to combine auto personalization (i.e., user AI) scoring and semantic scoring from the similarity algorithm and provide a dimensionless intuitive coverage map. FIGS. 4A-4H illustrate exemplary graphical user interfaces for the workflow for content AI suggestions in accordance with one or more embodiments of the invention.

Figure 4A:
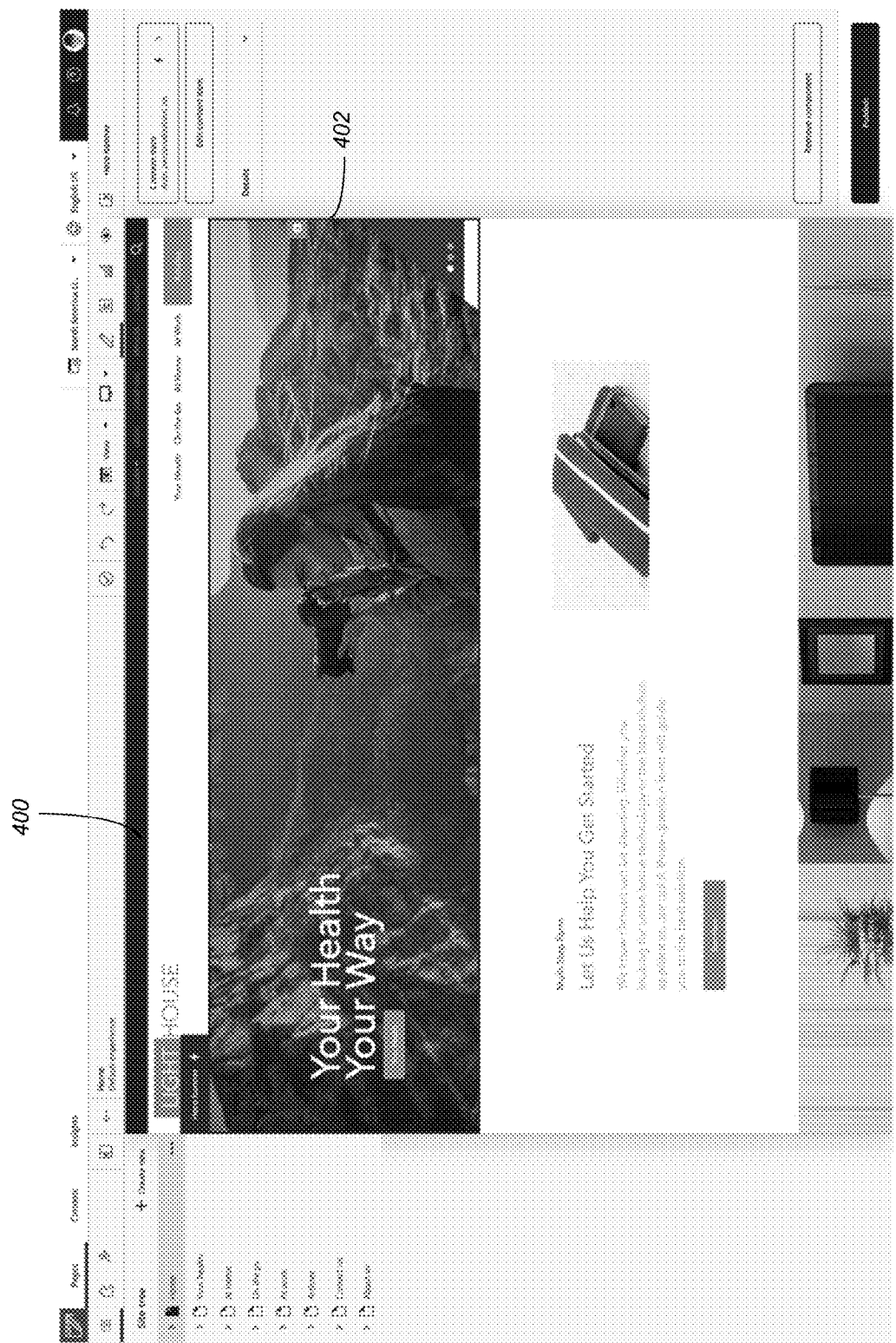
FIGS. 4A-4H illustrate exemplary graphical user interfaces for the workflow for content AI suggestion in accordance with one or more embodiments of the invention.

FIG. 4A illustrates a website 400 that includes a banner 402 that has been selected for personalization (selection is reflected by a darkened outline/border around the banner 402).

Figure 4B:
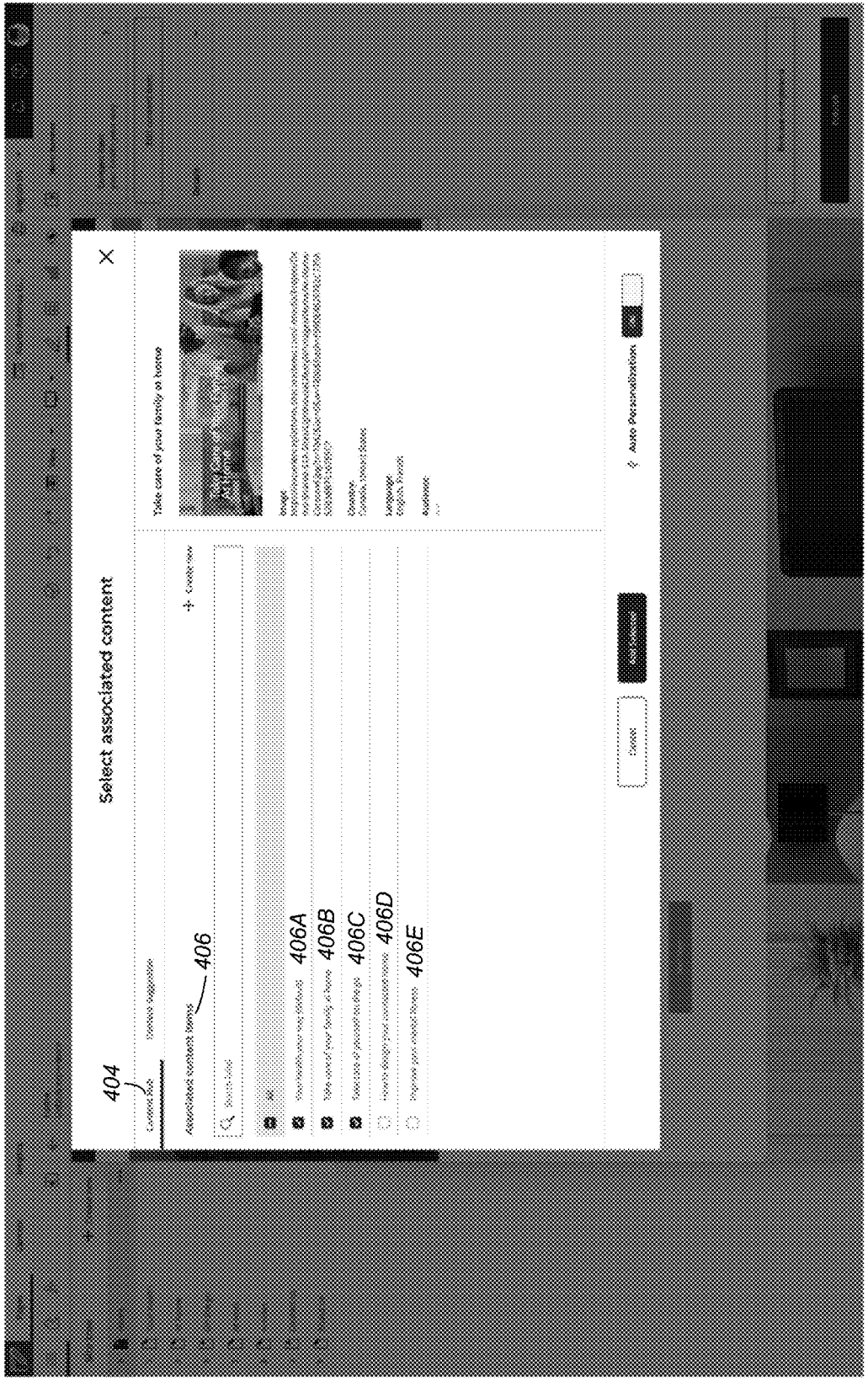

FIG. 4B enables a user to identify the content (within the content hub 404) to be associated with the selected asset 402. The associated content items 406 that are associated with the selected banner 402 are provided in a list. Checkboxes reflect the content items 406 already associated with the item as well as the default values (e.g., Your health your way (default) 406A, Take care of your family at home 406B, and Take care of yourself on the go 406C). Additional content items (e.g., How to design your connected home 406D and Improve your mental fitness 406E) available to be associated with the banner 402 may be displayed (e.g., and may be selected by clicking the checkboxes). In this regard, FIG. 4B illustrates the ability to select variations for a component (e.g., banner 402) and determine what is already associated with the component as well as the ability to modify/change the associations (e.g., by selecting/deselecting content items 406). Embodiments of the invention are not intended to be limited to any particular method for enabling selection/deselection or the format or the particular arrangement of graphical user interface elements (e.g., radio buttons, different labels, etc. may be utilized).

Figure 4C:
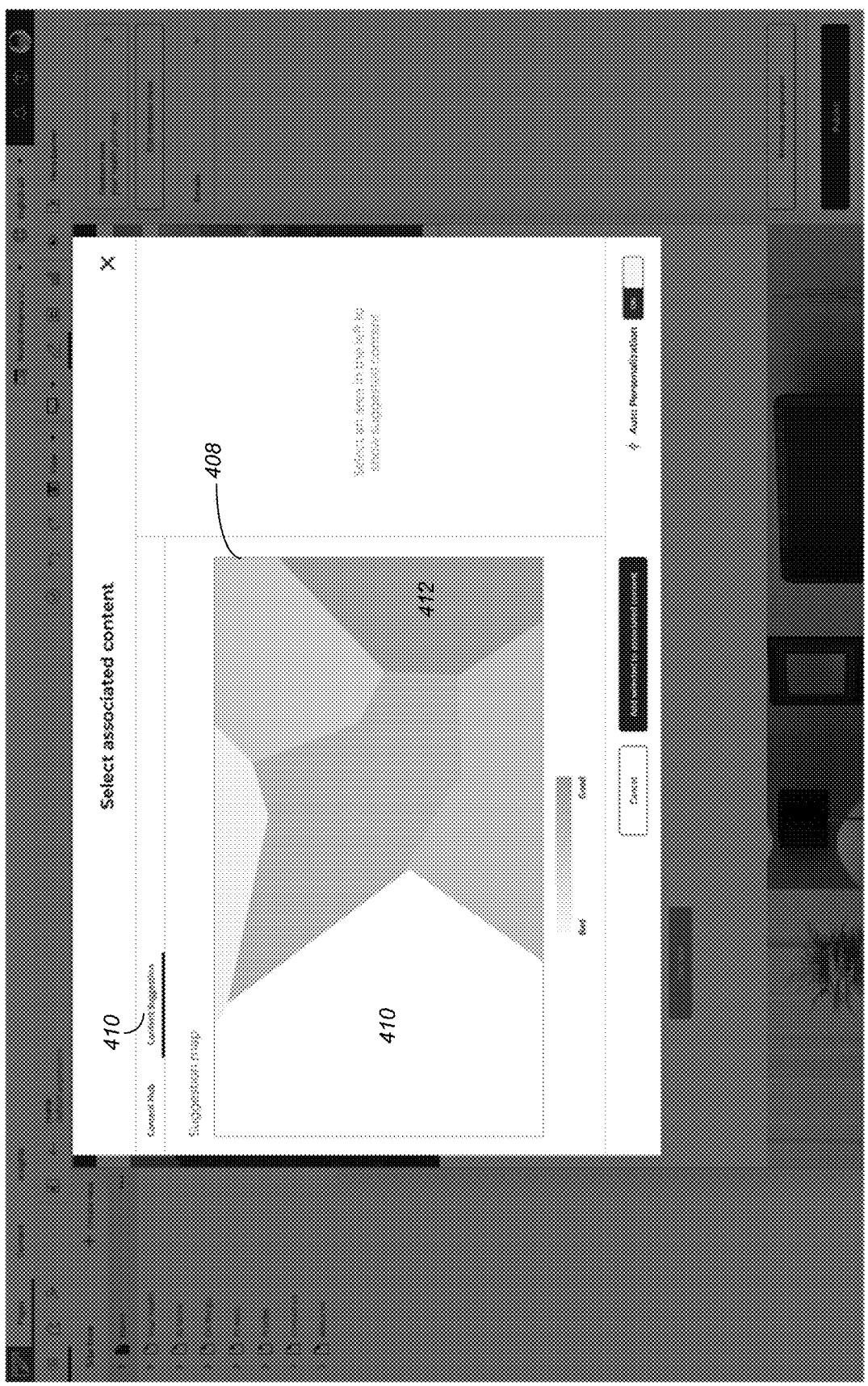

FIG. 4C illustrates a resulting content suggestion map 408 (e.g., within the content suggestion tab 410). Every point in the map 408 represents content as well as people. Also, each polygon in the map is a cluster (e.g., of users). The map preserves distance, meaning clusters that are similar (people with similar behavior) are close. The color in the map may vary across a range (e.g., from white 410 to dark green/shaded 412) with the coloring reflecting content selected (for a cluster). White 410 means there is not enough content for people in that cluster while a darker color/shade 412 (e.g., green) means there is enough content and good scores for people in that cluster (with shades in between reflecting differing amounts of content for that persons in that cluster). The goal of the coverage map 408 is to suggest sufficient content for people in each cluster so that the overall map color is dark (e.g., green).

In view of the above, as illustrated, embodiments of the invention provide the ability to represent clusters of people and content in two (2) dimensions utilizing color to identify content coverage. The issues become (1) how to represent the clusters in the two (2) dimensions, and (2) how to determine the color/shade of each cluster. The description herein will first walk through an exemplary graphical user interface for such clustering and coloring. Thereafter, a description of how the clustering and coloring is performed will be provided.

Figure 4D:
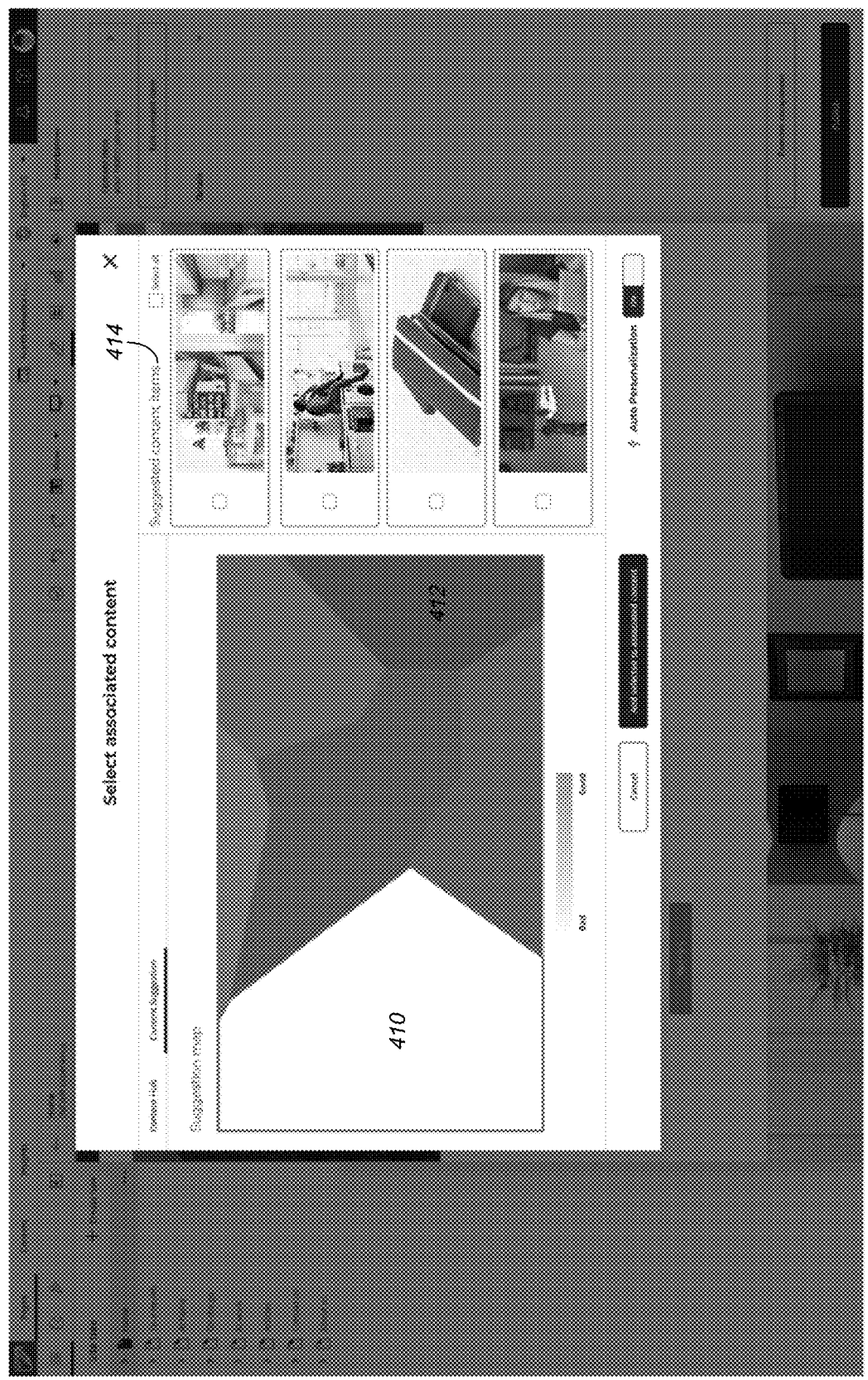

FIG. 4D illustrates the selection of the cluster 410. Once selected, the system suggests certain content items 414 for the selected cluster 410. In embodiments of the invention, the suggestions 414 are not just from the similarity algorithm but are also from the auto-personalization (user AI 124). In this regard, the similarity algorithm (described in FIGS. 2A and 2B) do not have a knowledge base relating to visitor/user behavior but is merely based on similarity of content without regard to the user behavior. The combination of both is utilized to produce the suggested content items 414 in FIG. 4D.

Figure 4E:
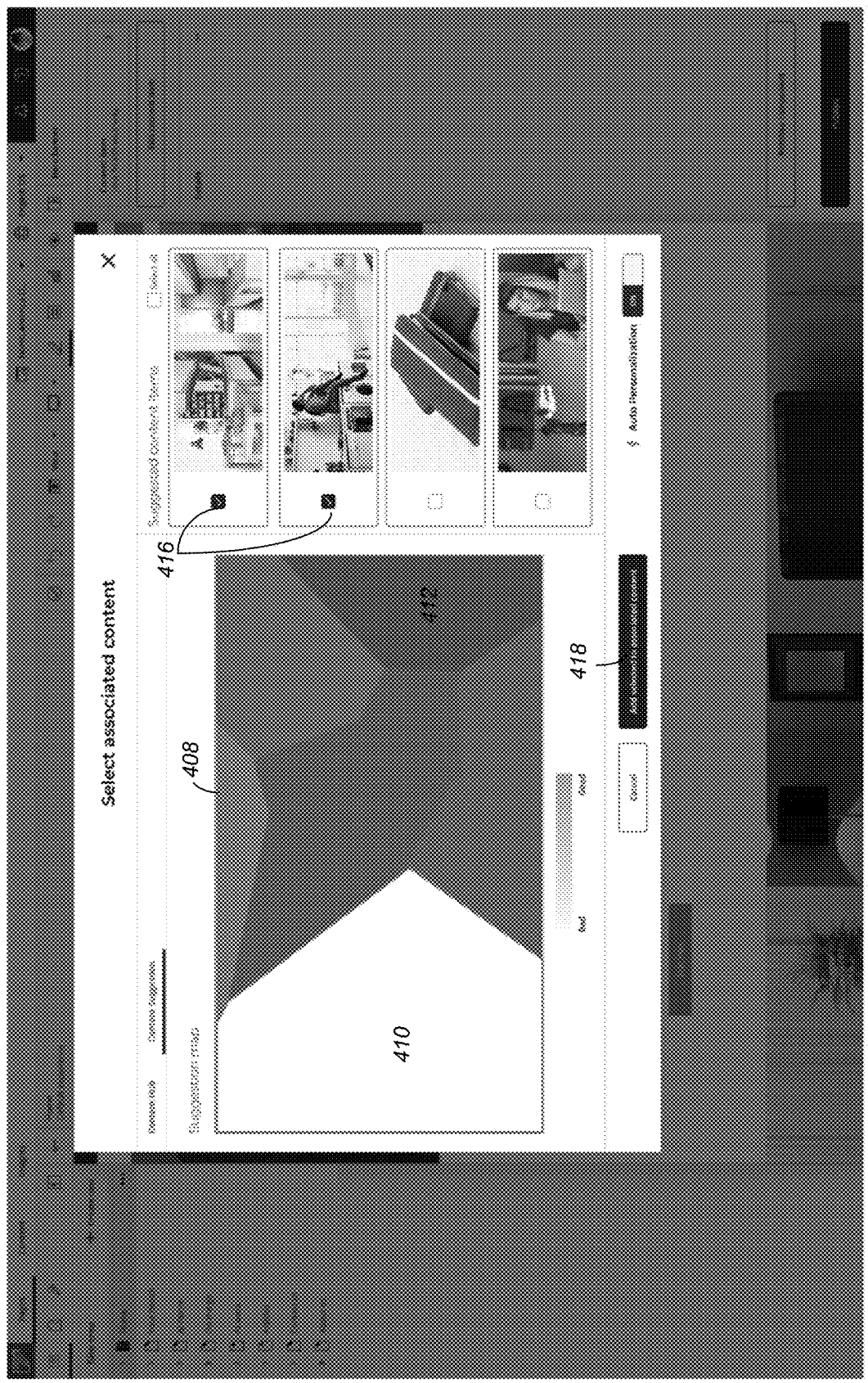

FIG. 4E illustrates the selection of two of the suggested content items 416 to be added to the selected cluster 410. To add the selected items, the user would click/select the "Add selected to associated content" button 418. Further, when identifying content for a particular cluster 410, different levels of granularity may be utilized such that a content item 416 may be associated with a particular point in the suggestion map 408.

Figure 4F:
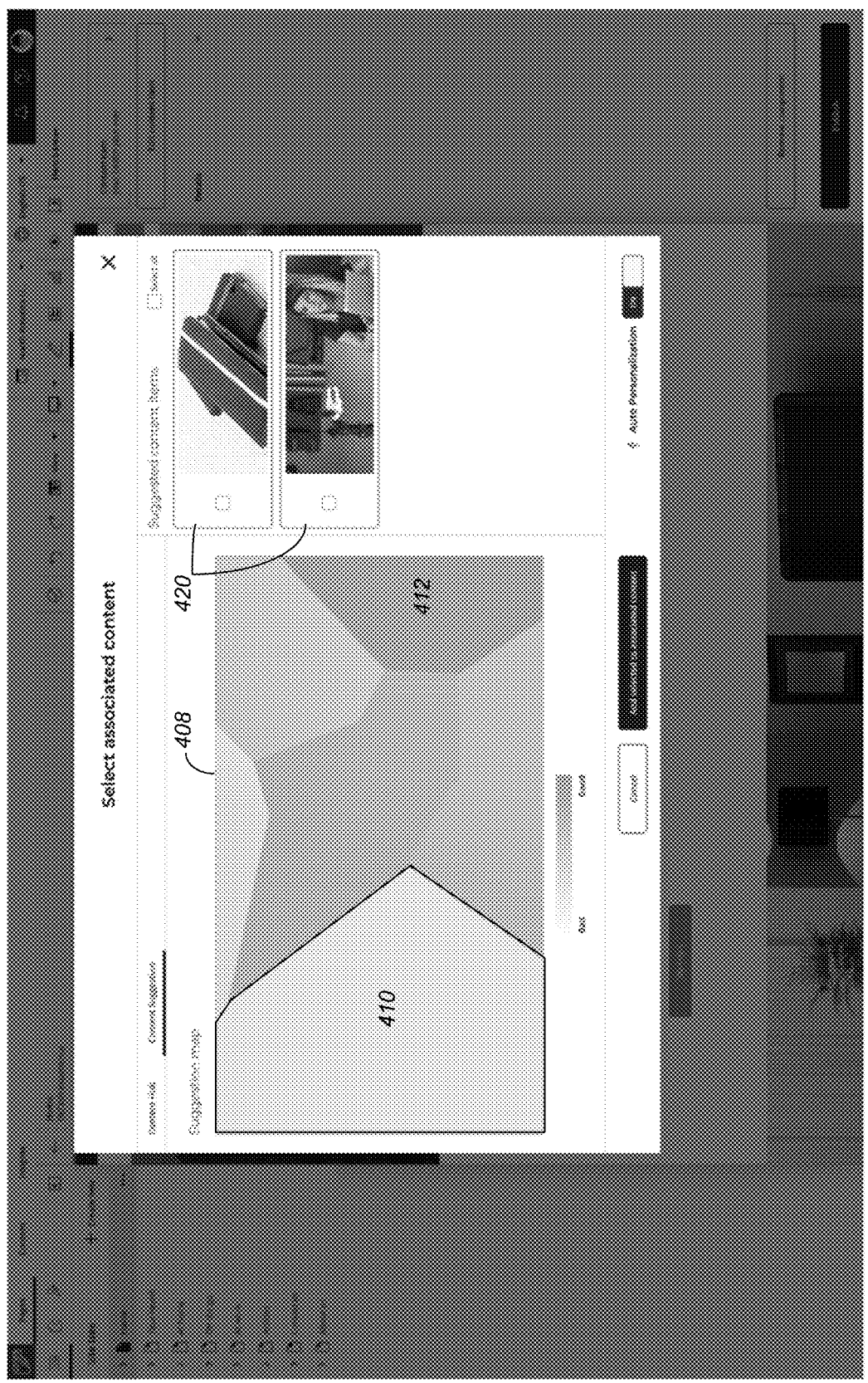

FIG. 4F shows the updated content suggestion map 408 that has been recomputed once the suggested content items 416 have been added to/associated with cluster 410. As illustrated, cluster 410 is no longer all white but has been shaded to reflect the association with the newly added content items 416. In addition, the user still has the option of adding the additional content items 420 to cluster 410.

Figure 4G:
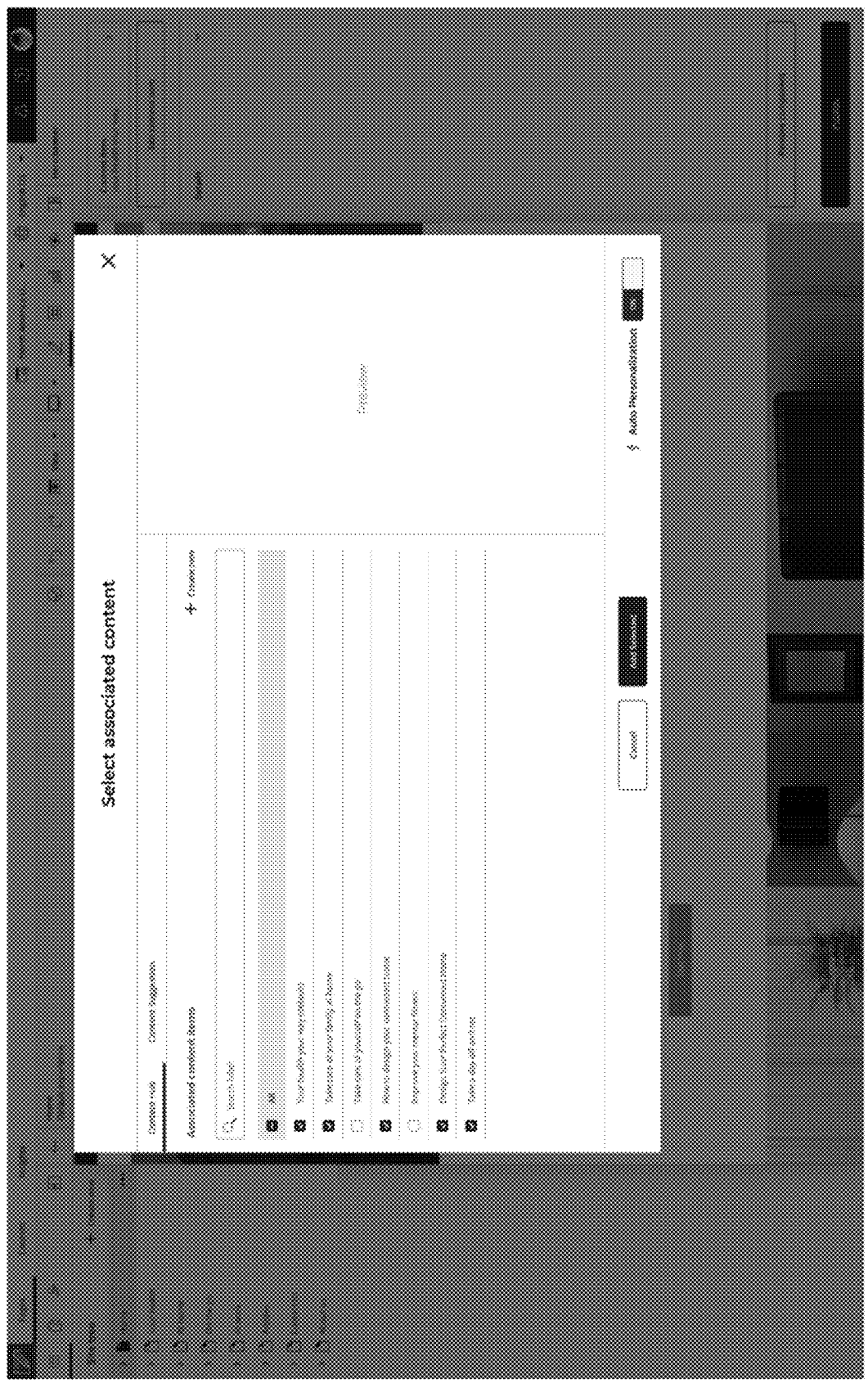

Similar to FIG. 4B, FIG. 4G illustrates the list of the content items that have been associated with the selected cluster 410 (and/or the entire map 408).

Figure 4H:
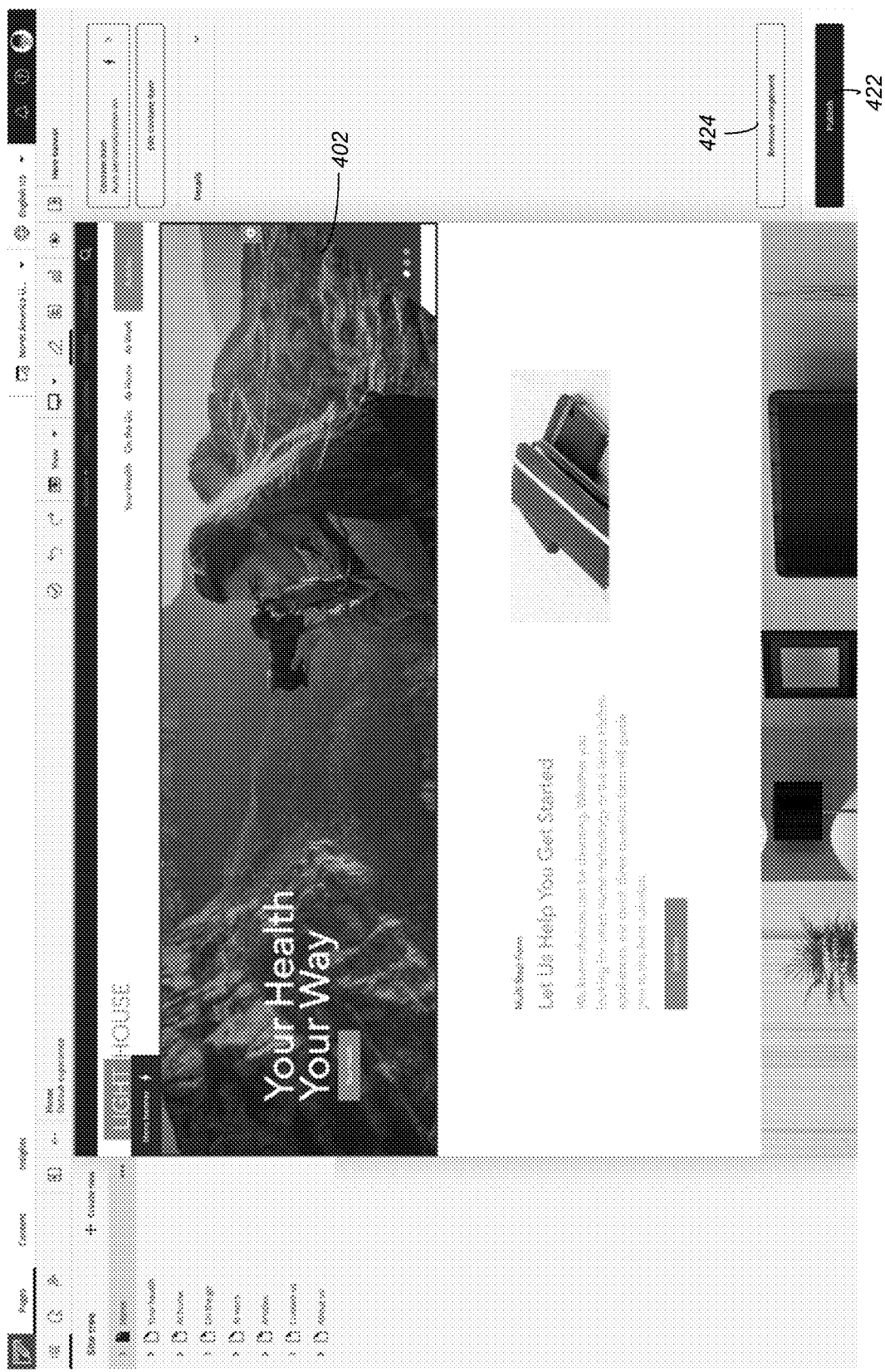

FIG. 4H illustrates the component 402 running with the auto-personalization executing with all of the content items identified in FIG. 4G. On a predefined interval (e.g., hourly, daily, weekly, etc.) the system may reevaluate the suggestion map 408 resulting in a change to the cluster shapes. To actually publish the website with the auto-personalization, the user may simply select the "publish" button 422. Alternatively, the user may remove a component from the auto-personalization/website by selecting a content item 402 and selecting the "Remove component" button 424. It may be noted that the user interface and options within the user interface may differ from the exemplary user interfaces illustrated in FIGS. 4A-4H.

Cluster Generation

In view of the exemplary user interface described above and illustrated in FIGS. 4A-4H, the questions are how to actually generate the clusters in two (2) dimensions (e.g., how to project multi-dimensional data onto 2D space) and how to determine the color/shading of each cluster. In one or more embodiments, the input data consists of the auto-personalization data and content data. Specifically, from auto-personalization, we have $w_{ik}$ and $\varphi_{kj}$ (contact i, content j, cluster k).

Cluster Representation in Two Dimensions

Manifold learning techniques may be used to reduce the dimension for each cluster to two. In other words, all the contacts may be represented in a particular cluster as a single point in the map:

$$w_{\cdot k} = [w_{1k}, w_{nk}, \ldots, w_{nk}] \rightarrow [x_k, y_k]$$

assuming we have n contacts (i=1, 2, ..., n) and K clusters (k=1, 2, ..., K), $[x_k, y_k]$, is the center of cluster k in the map. Later on, a Voronoi map may be used to define the boundaries for each cluster.

Manifold Learning

Manifold learning is an approach to non-linear dimensionality reduction.

High-dimensional datasets are hard to visualize and much less intuitive. Despite powerful supervised/unsupervised linear dimensionality reduction techniques such as Principal Component Analysis or Linear Discriminant Analysis to address this concern, these algorithms usually miss important non-linear structure in the data. On the other hand, Manifold Learning attempts to generalize linear frameworks to non-linear structure in data. There are different algorithms for Manifold Learning, such as: Isomap, Locally Linear Embedding, Modified Locally Linear Embedding, Multi-dimensional Scaling (MDS), t-distributed Stochastic Neighbor Embedding (t-SNE), etc. Embodiments of the invention may utilize any of the above manifold learning techniques. Described herein is the MDS technique/methodology.

Multidimensional scaling tries to represent data in a low-dimension while keeping distances in the original high-dimensional space. It attempts to model similarity or dissimilarity data as distances in a geometric space. Assume data is a collection of K objects on which a distance function is defined, $d_{i,j}$ (distance between i-th and j-th objects). These distances are the entries of the dissimilarity matrix. The goal of MDS is, given a dissimilarity matrix, to find K vectors $X_1, \ldots, X_K \in R^p$ (p is usually 2 or 3) such that $$\|X_i - X_j\| \approx d_{ij} \forall i,j \in 1, \ldots, K$$

In classical MDS, the norm is the Euclidean distance. In other words, MDS attempts to find a mapping from the K objects into $R^p$ such that distances are preserved. In an exemplary use case, MDS may be used to represent $w_{\cdot k} = [w_{1k}, w_{nk}, \ldots, w_{nk}]$ per cluster in two dimensions $[x_k, y_k]$. For example, In the following table, K is 10 and each K object has a dimension n=37497 (representing a total number of contacts). MDS may be used to get/project onto a 2D representation:

| | 89D5 BD13-DC0A-0000-0000-05E36 D171 FE5 | F6D58 6ED-3D99-0000-0000-05DD 77AA 851F | AE7C 16C9-586C-0000-0000-05D6 ABF3 C53A | 3D1F A0F0-BB1A-0000-0000-05DA 67F00 A3F | D3220 3C5-0535-0000-0000-05E31 F0D8 DC1 | 5B0F5 C12-DF79-0000-0000-05DD B08A DBB8 | 683A 8881-6F20-0000-0000-05D7 ED29 0172 | 851B BF6C-48D0-0000-0000-05E27 FD9A B4F | 0EED 73AA-9010-0000-0000-05C6 73125 4D9 |
|---|---|---|---|---|---|---|---|---|---|
| 0 | 1.0 | 0.0 | 0.0 | 0.0 | 1.0 | 0.0 | 0.0 | 0.0 | 0.0 |
| 1 | 0.0 | 0.0 | 0.0 | 0.0 | 0.0 | 1.0 | 0.0 | 1.0 | 0.0 |
| 2 | 0.0 | 0.0 | 0.0 | 0.0 | 0.0 | 0.0 | 1.0 | 0.0 | 0.0 |
| 3 | 0.0 | 1.0 | 1.0 | 1.0 | 0.0 | 0.0 | 0.0 | 0.0 | 0.0 |

-continued

| | 89D5<br>BD13-<br>DC0A-0000-<br>0000-05E36<br>D171<br>FE5 | F6D58<br>6ED-<br>3D99-0000-<br>0000-05DD<br>77AA<br>851F | AE7C<br>16C9-<br>586C-0000-<br>0000-05D6<br>ABF3<br>C53A | 3D1F<br>A0F0-BB1A-<br>0000-0000-<br>05DA<br>67F00<br>A3F | D3220<br>3C5-0535-<br>0000-0000-<br>05E31<br>F0D8<br>DC1 | 5B0F5<br>C12-DF79-<br>0000-0000-<br>05DD<br>B08A<br>DBB8 | 683A<br>8881-6F20-<br>0000-0000-<br>05D7<br>ED29<br>0172 | 851B<br>BF6C-48D0-<br>0000-0000-<br>05E27<br>FD9A<br>B4F | 0EED<br>73AA-9010-<br>0000-0000-<br>05C6<br>73125<br>4D9 |
|---|---|---|---|---|---|---|---|---|---|
| 4 | 0.0 | 0.0 | 0.0 | 0.0 | 0.0 | 0.0 | 0.0 | 0.0 | 0.0 |
| 5 | 0.0 | 0.0 | 0.0 | 0.0 | 0.0 | 0.0 | 0.0 | 0.0 | 1.0 |
| 6 | 0.0 | 0.0 | 0.0 | 0.0 | 0.0 | 0.0 | 0.0 | 0.0 | 0.0 |
| 7 | 0.0 | 0.0 | 0.0 | 0.0 | 0.0 | 0.0 | 0.0 | 0.0 | 0.0 |
| 8 | 0.0 | 0.0 | 0.0 | 0.0 | 0.0 | 0.0 | 0.0 | 0.0 | 0.0 |
| 9 | 0.0 | 0.0 | 0.0 | 0.0 | 0.0 | 0.0 | 0.0 | 0.0 | 0.0 |

10 rows × 37497 columns

| | x | y |
|---|---|---|
| 0 | 29.375068 | 18.144790 |
| 1 | 18.616132 | 74.793227 |
| 2 | −63.556536 | −6.075124 |
| 3 | 92.417984 | −38.571695 |
| 4 | 2.616504 | −34.170847 |
| 5 | −40.084101 | 33.988738 |
| 6 | −32.408975 | −63.809444 |
| 7 | −14.971373 | −2.761158 |
| 8 | 15.299842 | −8.458949 |
| 9 | −7.304545 | 26.920463 |

The center of each cluster is located in the above 2D map. Next, a Voronoi diagram may be used to shape the polygon for each cluster. A Voronoi diagram partitions the space based on the minimal distance to each object. For each object there is a corresponding region consisting of all points of the plane closer to that object than to any other.

Cluster Coloring/Shading

Now that the 2D map has been generated/obtained, the cluster polygons may be colored/shaded based on quality of content presented for their contacts. There are different ways to determine the color/shade for each cluster. An exemplary method is as follows:

Determine MAX = $\max_{k,j} \varphi_{kj}$ and MIN = $\min_{k,j} \varphi_{kj}$ values Find $\max_{j} \varphi_{kj}$ per cluster As described above, $\varphi_{kj}$ is measure of success of content j on cluster k. Next, the color range is divided from MIN to MAX such that the closest to MIN is assigned/receives a color white and the closest to MAX is assigned/receives a darker color (e.g., green). Based on max φ value per cluster, the appropriate color is then assigned to each cluster.

Logical Flow

Figure 5:
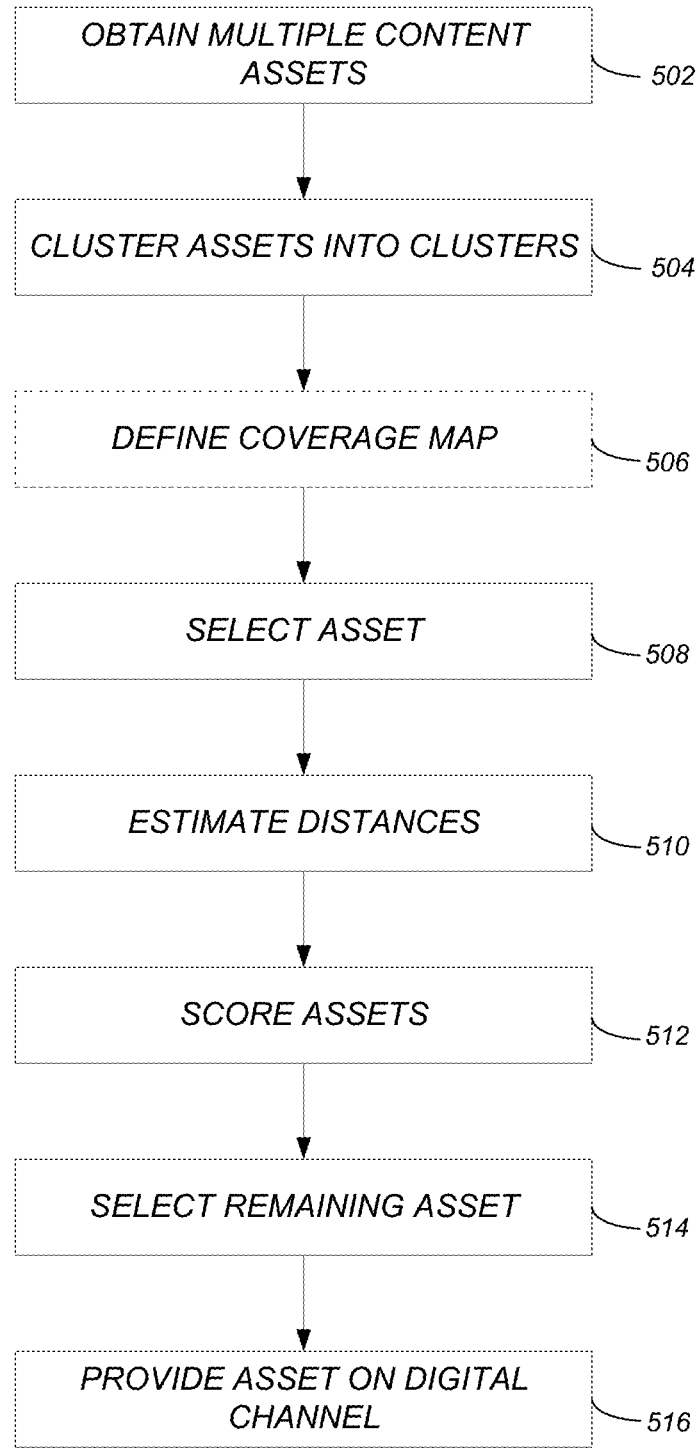
FIG. 5 illustrates the logical flow for personalizing a digital channel in accordance with one or more embodiments of the invention.

Based on the above, FIG. 5 illustrates the logical flow for personalizing a digital channel in accordance with one or more embodiments of the invention.

At step 502, multiple content assets are obtained. At least one of the multiple content assets is an image content asset. Further, each of the multiple content assets is associated with an associated set of semantic elements. To obtain the set of semantic elements for an image content asset, the image content asset may be processed using a vision algorithm resulting in an output of the associated set of semantic elements (i.e., that is associated with the image content asset).

At step 504, the multiple content assets are clustered into content clusters. The clustering is based on a similarity of the semantic elements in the associated sets of semantic elements associated with each of the multiple content assets. The clustering may be based on a Latent Dirichlet Allocation (LDA) algorithm where Dirichlet distributions are utilized as priors to model the semantic elements.

At step 506, if content AI suggestion is desired, a coverage map is defined. Using MDS and the score of each content item for each cluster of users, we can define a coverage map where each point of the map represents both a person (visitor) behavior and the semantic features of a content item. It enables the definition of distances between visitors, between content items and between a visitor and a content item. Clusters of users defined by the User AI define compact regions in the coverage map and if the digital marketer selects a region (cluster) the system uses the distance between visitors and items to suggest the items with the highest scores for that specific cluster. Content similarity extends the map to content items that do not have a score in User AI by using an average score of the semantic features weighted by the distance between the unscored content item and scored content items. The system can also display the content semantic features averaged scores for that specific cluster.

The following provide exemplary scores that may be provided/displayed:

Map→select region→cluster→score(cluster, item) in descending order of score.

Average semantic feature (man, tree, car, urban, . . . ) feature score in the cluster Suggest top K (ex: 10) items Suggest top K features (ex: urban 0.91, woman 0.82, casual pants 0.67)

In view of the above, at least one point in the coverage map represents a person and at least one other point in the coverage map represents one of the multiple content assets (e.g., a semantic feature of a content asset/item). Each polygon in the coverage map is/represents one of the content clusters. Further, the coverage map preserves the distances. In one or more embodiments, the image content asset may have never been provided on the digital channel to a visitor. In such an embodiment, the similarity of the associated semantic elements may be used to place the image content asset in the coverage map. Thereafter, the coverage map can be used to select the image content asset (in step 514) to provide on the digital channel.

At step 508, a first content asset of the multiple content assets is selected.

At step 510, the clustering is used as a metric to estimate distances between the first content asset and remaining multiple content assets.

At step 512, the remaining multiple content assets are scored based on the distances.

At step 514, one of the remaining multiple content assets is selected based on the scoring. For content AI suggestions, the coverage map may be utilized to select the one of the remaining multiple content assets.

At step 516, the selected remaining multiple content asset is provided for/as a personalized component of the digital channel.

Returning to step 506 and the use of the coverage map for content AI suggestions, multi-dimensional scaling (MDS) may be utilized to represent multiple dimensional data for the person (e.g., the multi-dimensional data for the person may be scaled/reduced/projected onto the coverage map based on MDS). For example, MDS may represent $w_{ik} = [w_{1k}, w_{nk}, \ldots, w_{nk}]$ per cluster in two dimensions $[x_k, y_k]$, where $w_{ik}$ measures how representative content cluster k is for person i→P(CLUSTER|USER), assuming n contacts (i=1, 2, ..., n) and K content clusters (k=1, 2, ..., K).

In addition, for the coverage map, a Voronoi map may be used to define a boundary for each polygon which center in a visitor cluster. Such a Voronoi diagram partitions space based on a minimal distance to each of the multiple content assets, and for each of the multiple content assets, there is a corresponding polygon comprising all points of a plane closer to that multiple content asset than to any of the other multiple content assets.

Further, cluster coloring may be utilized in defining the coverage map. In this regard, a color may be determined for each content cluster based on a quality of content presented. The color determination may consist of determining $$\text{MAX} = \max_{k,j} \varphi_{kj} \text{ and MIN} = \min_{k,j} \varphi_{kj} \text{ values,}$$

where $\varphi_{kj}$ is a measure of success of content j on content cluster k, finding $$\max_j \varphi_{kj}$$

per content cluster, dividing a color range from MIN to MAX such that a closest to MIN is assigned a first color and a closest to MAX is assigned a second color, and additional colors in the color range are assigned based on proximity to MIN and MAX. Thereafter, based on the $$\max_j \varphi_{kj}$$

per content cluster, one of the colors within the color range is assigned to each content cluster.

With respect to the coverage map definition of step 506, an additional point in the coverage map may be interpolated for a visitor that is requesting the digital channel. Thereafter, the one of the remaining multiple content assets is selected based on the additional point and distance to remaining multiple content assets.

In addition, steps 502-516 may be performed iteratively to enable machine learning. For example, the coverage map may be autonomously updated on a defined interval. Such an autonomous updating may consist of recomputing the clustering based on updated semantic elements. In this regard, referring to FIG. 1, the recomputing serves to train the models 134 that are then used to select and provide the content 118. In addition, the clustering and content selection may also be based on the user AI 124 (i.e., the user personalization) (e.g., as part of the training 132 of models 134). Accordingly, content AI suggestions leverages both visitor clusters generated by auto-segmentation of auto-personalization/user AI 124 and content AI 120 similarity to address content that was not previously seen by/delivered to a visitor (and thus not scored as part of the training 126 during the auto-personalization of clusters in the user AI 124). Further, the coverage map and suggestions may be presented to back-end user (e.g., a web developer) throughout the process in order for the back-end user to determine how and when to personalize a digital channel. Alternatively, the coverage map and suggestions may be autonomously performed without additional back-end user interaction.

Hardware Environment

Figure 6:
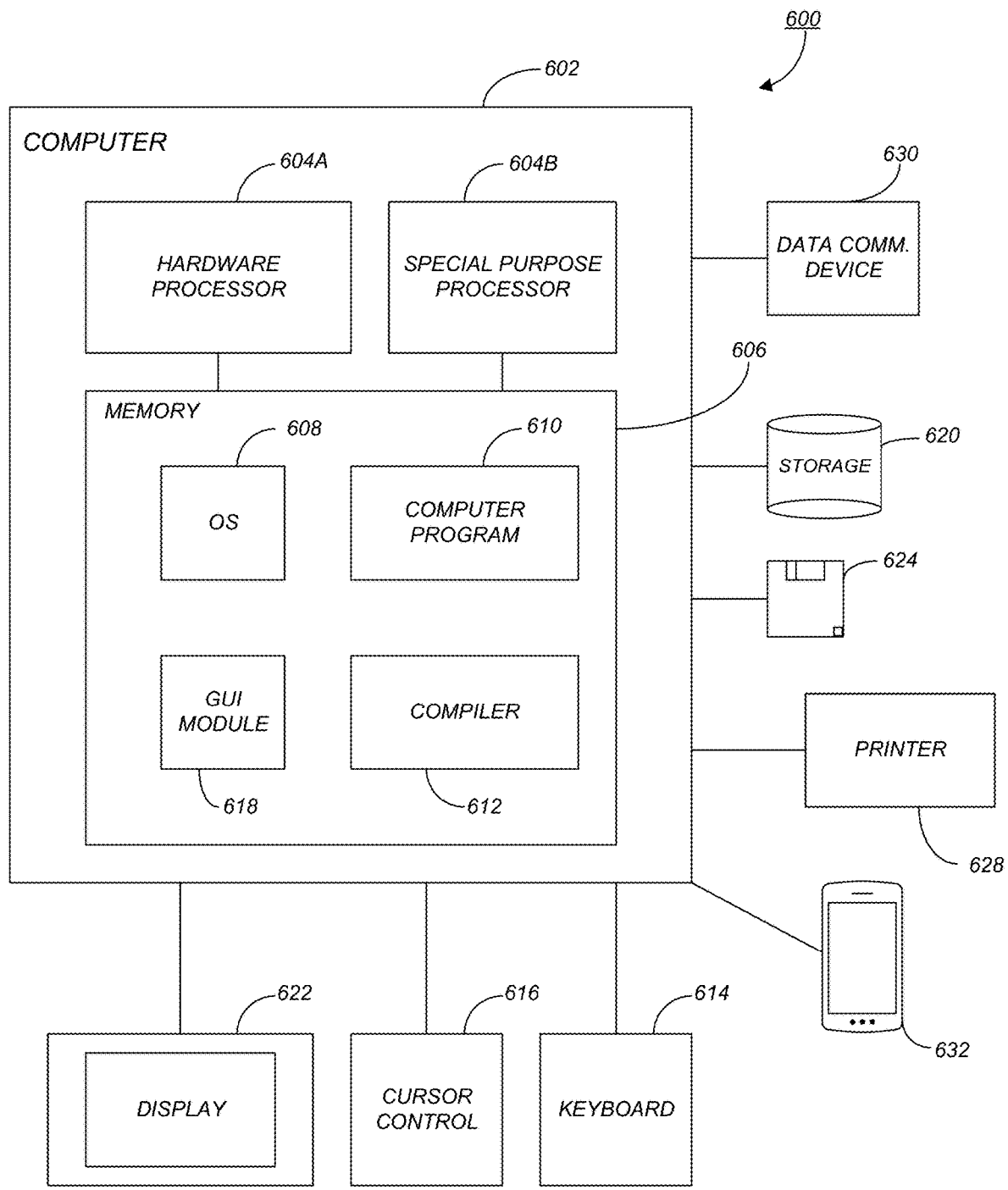
FIG. 6 is an exemplary hardware and software environment used to implement one or more embodiments of the invention.

FIG. 6 is an exemplary hardware and software environment 600 (referred to as a computer-implemented system and/or computer-implemented method) used to implement one or more embodiments of the invention. The hardware and software environment includes a computer 602 and may include peripherals. Computer 602 may be a user/client computer, server computer, or may be a database computer. The computer 602 comprises a hardware processor 604A and/or a special purpose hardware processor 604B (hereinafter alternatively collectively referred to as processor 604) and a memory 606, such as random access memory (RAM). The computer 602 may be coupled to, and/or integrated with, other devices, including input/output (I/O) devices such as a keyboard 614, a cursor control device 616 (e.g., a mouse, a pointing device, pen and tablet, touch screen, multi-touch device, etc.) and a printer 628. In one or more embodiments, computer 602 may be coupled to, or may comprise, a portable or media viewing/listening device 632 (e.g., an MP3 player, IPOD, NOOK, portable digital video player, cellular device, personal digital assistant, etc.). In yet another embodiment, the computer 602 may comprise a multi-touch device, mobile phone, gaming system, internet enabled television, television set top box, or other internet enabled device executing on various platforms and operating systems.

In one embodiment, the computer 602 operates by the hardware processor 604A performing instructions defined by the computer program 610 (e.g., a computer-aided design [CAD] application) under control of an operating system 608. The computer program 610 and/or the operating system 608 may be stored in the memory 606 and may interface with the user and/or other devices to accept input and commands and, based on such input and commands and the instructions defined by the computer program 610 and operating system 608, to provide output and results.

Output/results may be presented on the display 622 or provided to another device for presentation or further processing or action. In one embodiment, the display 622 comprises a liquid crystal display (LCD) having a plurality of separately addressable liquid crystals. Alternatively, the display 622 may comprise a light emitting diode (LED) display having clusters of red, green and blue diodes driven together to form full-color pixels. Each liquid crystal or pixel of the display 622 changes to an opaque or translucent state to form a part of the image on the display in response to the data or information generated by the processor 604 from the application of the instructions of the computer program 610 and/or operating system 608 to the input and commands. The image may be provided through a graphical user interface (GUI) module 618. Although the GUI module 618 is depicted as a separate module, the instructions performing the GUI functions can be resident or distributed in the operating system 608, the computer program 610, or implemented with special purpose memory and processors.

In one or more embodiments, the display 622 is integrated with/into the computer 602 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program 610 instructions. In one embodiment, the special purpose processor 604B is an application specific integrated circuit (ASIC).

The computer 602 may also implement a compiler 612 that allows an application or computer program 610 written in a programming language such as C, C++, Assembly, SQL, PYTHON, PROLOG, MATLAB, RUBY, RAILS, HASKELL, or other language to be translated into processor 604 readable code. Alternatively, the compiler 612 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 610 accesses and manipulates data accepted from I/O devices and stored in the memory 606 of the computer 602 using the relationships and logic that were generated using the compiler 612.

The computer 602 also optionally comprises an external communication device such as a modem, satellite link, Ethernet card, or other device for accepting input from, and providing output to, other computers 602.

In one embodiment, instructions implementing the operating system 608, the computer program 610, and the compiler 612 are tangibly embodied in a non-transitory computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of computer program 610 instructions which, when accessed, read and executed by the computer 602, cause the computer 602 to perform the steps necessary to implement and/or use the present invention or to load the program of instructions into a memory 606, thus creating a special purpose data structure causing the computer 602 to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 602.

Figure 7:
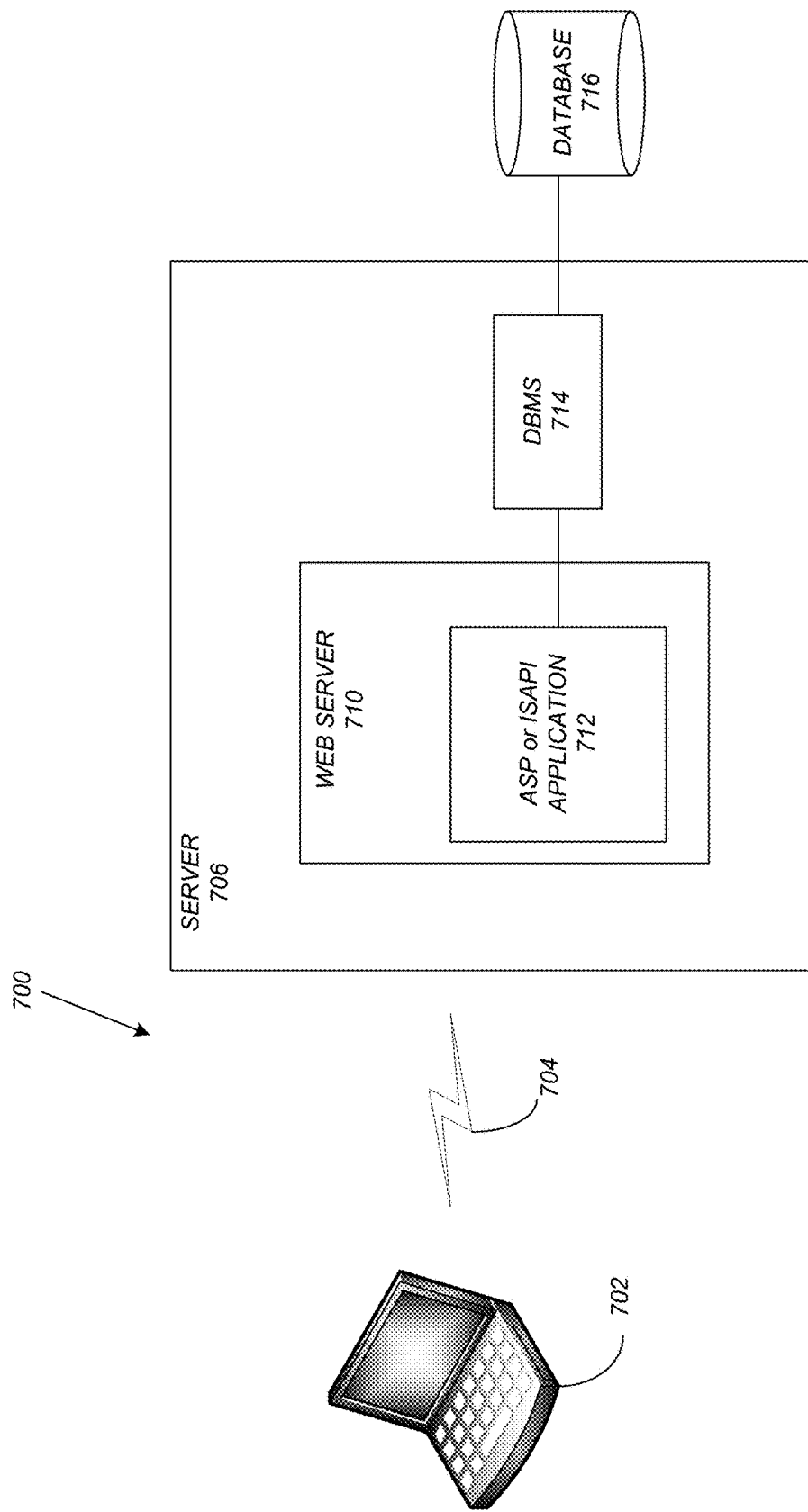
FIG. 7 schematically illustrates a typical distributed/cloud-based computer system using a network to connect client computers to server computers in accordance with one or more embodiments of the invention.

FIG. 7 schematically illustrates a typical distributed/cloud-based computer system 700 using a network 704 to connect client computers 702 to server computers 706. A typical combination of resources may include a network 704 comprising the Internet, LANs (local area networks), WANs (wide area networks), SNA (systems network architecture) networks, or the like, clients 702 that are personal computers or workstations (as set forth in FIG. 6), and servers 706 that are personal computers, workstations, minicomputers, or mainframes (as set forth in FIG. 6). However, it may be noted that different networks such as a cellular network (e.g., GSM [global system for mobile communications] or otherwise), a satellite based network, or any other type of network may be used to connect clients 702 and servers 706 in accordance with embodiments of the invention.

A network 704 such as the Internet connects clients 702 to server computers 706. Network 704 may utilize ethernet, coaxial cable, wireless communications, radio frequency (RF), etc. to connect and provide the communication between clients 702 and servers 706. Further, in a cloud-based computing system, resources (e.g., storage, processors, applications, memory, infrastructure, etc.) in clients 702 and server computers 706 may be shared by clients 702, server computers 706, and users across one or more networks. Resources may be shared by multiple users and can be dynamically reallocated per demand. In this regard, cloud computing may be referred to as a model for enabling access to a shared pool of configurable computing resources.

Clients 702 may execute a client application or web browser and communicate with server computers 706 executing web servers 710. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 702 may be downloaded from server computer 706 to client computers 702 and installed as a plug-in or ACTIVEX control of a web browser. Accordingly, clients 702 may utilize ACTIVEX components/component object model (COM) or distributed COM (DCOM) components to provide a user interface on a display of client 702. The web server 710 is typically a program such as MICROSOFT'S INTERNET INFORMATION SERVER.

Web server 710 may host an Active Server Page (ASP) or Internet Server Application Programming Interface (ISAPI) application 712, which may be executing scripts. The scripts invoke objects that execute business logic (referred to as business objects). The business objects then manipulate data in database 716 through a database management system (DBMS) 714. Alternatively, database 716 may be part of, or connected directly to, client 702 instead of communicating/obtaining the information from database 716 across network 704. When a developer encapsulates the business functionality into objects, the system may be referred to as a component object model (COM) system. Accordingly, the scripts executing on web server 710 (and/or application 712) invoke COM objects that implement the business logic. Further, server 706 may utilize MICROSOFT'S TRANSACTION SERVER (MTS) to access required data stored in database 716 via an interface such as ADO (Active Data Objects), OLE DB (Object Linking and Embedding DataBase), or ODBC (Open DataBase Connectivity).

Generally, these components 700-716 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 702 and 706 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 702 and 706. Embodiments of the invention are implemented as a software/CAD application on a client 702 or server computer 706. Further, as described above, the client 702 or server computer 706 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] Lee, Daniel D., and Sebastian Seung. "Algorithms for non-negative matrix factorization." *Advances in neural information processing systems*. 2001.

[2] Blei, David M., Andrew Y. Ng, and Michael I. Jordan. "Latent dirichlet allocation." *Journal of machine Learning research* 3 January (2003): 993-1022.

[3] Zou, Hui, and Trevor Hastie. "Regularization and variable selection via the elastic net." *Journal of royal statistical society: series B (statistical methodology)* 67.2 (2005): 301-320.

[4] Friedman, Jerome H. "Greedy function approximation: a gradient boosting machine." *Annals of statistics* (2001): 1189-1232.

[5] LeCun, Yana, Yoshua Bengio, and Geoffrey Hinton. "Deep learning." *nature* 521.7553 (2015): 436.

[6] Vanchinathan, Hastagiri P., et al. "Explore-exploit in top-n recommender systems via gaussian processes." *Proceedings of the 8th ACM Conference on Recommender systems*. ACM, 2014.

[7] Pang, Bo, and Lillian Lee. "Opinion mining and sentiment analysis." *Foundations and Trends® in Information Retrieval* 2.1-2 (2008): 1-135.

What is claimed is:

1. A computer-implemented method for personalizing a digital channel, comprising:
   (a) obtaining multiple content assets, wherein:
      (1) at least one of the multiple content assets comprises an image content asset; and
      (2) each of the multiple content assets is associated with an associated set of semantic elements;
   (b) clustering the multiple content assets into content clusters, wherein the clustering is based on a similarity of the semantic elements in the associated sets of semantic elements associated with each of the multiple content assets;
   (c) defining and displaying a coverage map, wherein:
      (1) at least one point in the coverage map represents one of the multiple content assets; and
      (2) each polygon in the coverage map comprises one of the clusters;
   (d) selecting a first content asset of the multiple content assets;
   (e) using the clustering as a metric to estimate distances between the first content asset and remaining multiple content assets, wherein the coverage map preserves the distances;
   (f) scoring the remaining multiple content assets based on the distances;
   (g) selecting one of the remaining multiple content assets based on the scoring; and
   (h) providing the selected remaining multiple content asset for a personalized component of the digital channel.

2. The computer-implemented method of claim 1, further comprising:
   processing, using a vision algorithm, the image content asset, wherein the processing outputs the associated set of semantic elements that is associated with the image content asset.

3. The computer-implemented method of claim 1, wherein:
   the clustering is based on a Latent Dirichlet Allocation (LDA) algorithm where Dirichlet distributions are utilized as priors to model the semantic elements.

4. The computer-implemented method of claim 1, wherein:
   at least one point in the coverage map represents a person.

5. The computer-implemented method of claim 4, further comprising:

utilizing multi-dimensional scaling (MDS) to represent multiple dimensional data for the person.

6. The computer-implemented method of claim 5, wherein:

MDS represents $w_{ik}=[w_{1k}, w_{nk}, \ldots, w_{nk}]$ per cluster in two dimensions $[x_k, y_k]$, where $w_{ik}$ measures how representative content cluster k is for person i←P(CLUSTER|USER), assuming n contacts (i=1, 2, ..., n) and K content clusters (k=1, 2, ..., K).

7. The computer-implemented method of claim 5, further comprising:

utilizing a Voronoi map to define a boundary for each polygon, wherein:

the Voronoi diagram partitions space based on a minimal distance to each of the multiple content assets; and for each of the multiple content assets, there is a corresponding polygon comprising all points of a plane closer to that multiple content asset than to any other multiple content asset.

8. The computer-implemented method of claim 4, further comprising:

determining a color for each content cluster, wherein the color is based on a quality of content presented.

9. The computer-implemented method of claim 8, wherein the determining the color comprises:

determining $$\text{MAX} = \max_{k,j} \varphi_{kj} \text{ and } \text{MIN} = \min_{k,j} \varphi_{kj} \text{ values,}$$

where $\varphi_{kj}$ comprises a measure of success of content j on content cluster k;

finding $$\max_{j} \varphi_{kj}$$

per content cluster;

dividing a color range from MIN to MAX such that a closest to MIN is assigned a first color and a closest to MAX is assigned a second color, and additional colors in the color range are assigned based on proximity to MIN and MAX; and based on the $$\max_{j} \varphi_{kj}$$

per content cluster, assigning one of the colors within the color range to each content cluster.

10. The computer-implemented method of claim 4, wherein:

an additional point in the coverage map is interpolated for a visitor;

the visitor is requesting the digital channel; and the one of the remaining multiple content assets is selected based on the additional point and distance to remaining multiple content assets.

11. The computer-implemented method of claim 4, wherein:

the image content asset has never been provided on the digital channel to a visitor;

the similarity of the semantic elements are used to place the image content asset in the coverage map; and the coverage map is used to select the image content asset to provide on the digital channel.

12. The computer-implemented method of claim 4, further comprising:

autonomously updating the coverage map on a defined interval, wherein the autonomously updating comprises recomputing the clustering based on updated semantic elements.

13. A computer-implemented system for personalizing a digital channel, comprising:

(a) a computer having a memory;
(b) a processor executing on the computer;
(c) the memory storing a set of instructions, wherein the set of instructions, when executed by the processor cause the processor to perform operations comprising:
  (1) obtaining multiple content assets, wherein:
    (i) at least one of the multiple content assets comprises an image content asset; and
    (ii) each of the multiple content assets is associated with an associated set of semantic elements;
  (2) clustering the multiple content assets into content clusters, wherein the clustering is based on a similarity of the semantic elements in the associated sets of semantic elements associated with each of the multiple content assets;
  (3) defining and displaying a coverage map, wherein:
    (i) at least one point in the coverage map represents one of the multiple content assets; and
    (ii) each polygon in the coverage map comprises one of the clusters;
  (4) selecting a first content asset of the multiple content assets;
  (5) using the clustering as a metric to estimate distances between the first content asset and remaining multiple content assets, wherein the coverage map preserves the distances;
  (6) scoring the remaining multiple content assets based on the distances;
  (7) selecting one of the remaining multiple content assets based on the scoring; and
  (8) providing the selected remaining multiple content asset for a personalized component of the digital channel.

14. The computer-implemented system of claim 13, wherein the operations further comprise:

processing, using a vision algorithm, the image content asset, wherein the processing outputs the associated set of semantic elements that is associated with the image content asset.

15. The computer-implemented system of claim 13, wherein:

the clustering is based on a Latent Dirichlet Allocation (LDA) algorithm where Dirichlet distributions are utilized as priors to model the semantic elements.

16. The computer-implemented system of claim 13, wherein at least one point in the coverage map represents a person.

17. The computer-implemented system of claim 16, wherein the operations further comprise:

utilizing multi-dimensional scaling (MDS) to represent multiple dimensional data for the person.

18. The computer-implemented system of claim 17, wherein:

MDS represents $w_{ik}=[w_{1k}, w_{nk}, \ldots, w_{nk}]$ per cluster in two dimensions $[x_k, y_k]$, where $w_{ik}$ measures how representative content cluster k is for person i←P(CLUSTER|USER), assuming n contacts (i=1, 2, . . . , n) and K content clusters (k=1, 2, . . . , K).

19. The computer-implemented system of claim 17, wherein the operations further comprise:
utilizing a Voronoi map to define a boundary for each polygon, wherein:
the Voronoi diagram partitions space based on a minimal distance to each of the multiple content assets; and
for each of the multiple content assets, there is a corresponding polygon comprising all points of a plane closer to that multiple content asset than to any other multiple content asset.

20. The computer-implemented system of claim 16, wherein the operations further comprise:
determining a color for each content cluster, wherein the color is based on a quality of content presented.

21. The computer-implemented system of claim 20, wherein the operation determining the color comprises:
determining $$MAX = \max_{k,j} \varphi_{kj} \text{ and } MIN = \min_{k,j} \varphi_{kj} \text{ values,}$$

where $\varphi_{kj}$ comprises a measure of success of content j on content cluster k;
finding $$\max_{j} \varphi_{kj}$$

per content Cluster;
dividing a color range from MIN to MAX such that a closest to MIN is assigned a first color and a closest to MAX is assigned a second color, and additional colors in the color range are assigned based on proximity to MIN and MAX; and
based on the $$\max_{j} \varphi_{kj}$$

per content cluster, assigning one of the colors within the color range to each content cluster.

22. The computer-implemented system of claim 16, wherein:
an additional point in the coverage map is interpolated for a visitor;
the visitor is requesting the digital channel; and
the one of the remaining multiple content assets is selected based on the additional point and distance to remaining multiple content assets.

23. The computer-implemented system of claim 16, wherein:
the image content asset has never been provided on the digital channel to a visitor;
the similarity of the semantic elements are used to place the image content asset in the coverage map; and
the coverage map is used to select the image content asset to provide on the digital channel.

24. The computer-implemented system of claim 16, wherein the operations further comprise:
autonomously updating the coverage map on a defined interval, wherein the autonomously updating comprises recomputing the clustering based on updated semantic elements.

\* \* \* \* \*